(12) United States Patent
Pechstedt

(10) Patent No.: US 10,545,035 B2
(45) Date of Patent: Jan. 28, 2020

(54) OPTICAL SENSOR WITH ONE OR MORE SENSING INTERFERENCE ELEMENTS

(71) Applicant: Oxsensis Limited, Didcot (GB)

(72) Inventor: Ralf-Dieter Pechstedt, Didcot (GB)

(73) Assignee: Oxsensis Limited, Didcot (GB)

( * ) Notice: Subject to any disclaimer, the term of this patent is extended or adjusted under 35 U.S.C. 154(b) by 15 days.

(21) Appl. No.: 15/682,114

(22) Filed: Aug. 21, 2017

(65) Prior Publication Data

US 2018/0045541 A1 Feb. 15, 2018

Related U.S. Application Data

(62) Division of application No. 14/385,421, filed as application No. PCT/GB2013/050619 on Mar. 13, 2013, now Pat. No. 9,766,099.

(30) Foreign Application Priority Data

Mar. 16, 2012 (GB) .................................. 1204673.6

(51) Int. Cl.
*G01D 5/353* (2006.01)
*G01L 19/00* (2006.01)
(Continued)

(52) U.S. Cl.
CPC ..... *G01D 5/35306* (2013.01); *G01D 5/35332* (2013.01); *G01K 11/3206* (2013.01); *G01L 9/0079* (2013.01); *G01L 19/0092* (2013.01); *G01P 1/006* (2013.01); *G01P 15/08* (2013.01); *G01P 15/093* (2013.01)

(58) Field of Classification Search
CPC ....... G01L 1/24; G01L 1/2469; G01L 9/0079; G01L 9/0092; G01J 3/26; G01D 5/35306; G01D 5/35312; G01D 5/35332; G01B 9/02074; G01B 9/02083; G01B 9/02084
See application file for complete search history.

(56) References Cited

U.S. PATENT DOCUMENTS

| | | |
|---|---|---|
| 5,042,905 A | 8/1991 | Anjan et al. |
| 5,218,420 A | 6/1993 | Asmar |

(Continued)

FOREIGN PATENT DOCUMENTS

| | | |
|---|---|---|
| CN | 101368979 A | 2/2009 |
| CN | 101424696 A | 5/2009 |

(Continued)

OTHER PUBLICATIONS

International Search Report and Written Opinion of the International Searching Authority from corresponding PCT/GB2013/050619 dated May 15, 2014.

(Continued)

*Primary Examiner* — Michael A Lyons
(74) *Attorney, Agent, or Firm* — Wolf, Greenfield & Sacks, P.C.

(57) ABSTRACT

An optical sensor having one or more sensing interference elements is disclosed. A first detector function generates a coarse optical path difference signal for example using a discrete Fourier transform of a detected interference spectrum, and a second detector function generates a refined optical path difference signal using the coarse optical path difference signal and for example a cross correlation of the interference spectrum with one or more sets of periodic transfer functions.

22 Claims, 20 Drawing Sheets

(51) Int. Cl.
*G01L 9/00* (2006.01)
*G01K 11/32* (2006.01)
*G01P 15/08* (2006.01)
*G01P 1/00* (2006.01)
*G01P 15/093* (2006.01)

(56) References Cited

U.S. PATENT DOCUMENTS

| | | | |
|---|---|---|---|
| 6,016,702 | A | 1/2000 | Maron |
| 6,078,706 | A | 6/2000 | Nau et al. |
| 6,414,303 | B1 | 7/2002 | Kersey |
| 7,054,011 | B2 | 5/2006 | Zhu et al. |
| 7,728,984 | B2 | 6/2010 | Waegli et al. |
| 9,766,099 | B2 | 9/2017 | Pechstedt |
| 2003/0174924 | A1 | 9/2003 | Tennyson |
| 2004/0052444 | A1 | 3/2004 | Moslehi et al. |
| 2005/0046862 | A1 | 3/2005 | Melnyk |
| 2005/0157305 | A1 | 7/2005 | Yu et al. |
| 2007/0006663 | A1 | 1/2007 | Zerwekh et al. |
| 2008/0232748 | A1 | 9/2008 | Nash |
| 2010/0128756 | A1 | 5/2010 | Lee et al. |
| 2011/0317148 | A1 | 12/2011 | Froggatt et al. |
| 2012/0050735 | A1 | 3/2012 | Higgins et al. |
| 2015/0033848 | A1 | 2/2015 | Pechstedt |

FOREIGN PATENT DOCUMENTS

| | | | |
|---|---|---|---|
| EP | 0 154 025 | A1 | 9/1985 |
| EP | 1 816 432 | B1 | 8/2007 |
| GB | 2 002 936 | A | 2/1979 |
| GB | 2 421 586 | B | 6/2006 |
| JP | H03-257374 | A | 11/1991 |
| WO | WO 2005/098385 | A1 | 10/2005 |
| WO | WO 2009/077727 | A2 | 6/2009 |

OTHER PUBLICATIONS

First United Kingdom Search Report from corresponding United Kingdom Application No. GB1204673.6 dated Jul. 16, 2012.
Second United Kingdom Search Report from corresponding United Kingdom Application No. GB1204673.6 dated Mar. 6, 2013.
Egorov et al. Advanced Signal Processing Method for Interferometric Fiber optic Sensors with straightforward spectral Detection. Proc SPIE, vol. 3201, 44 (1997).
Jiang, Fourier Transform White Light Interferometry for the Measurement of Fiber Optic Extrinsic Fabry Perot Interferometric Sensors, IEEE Photonics Technology Letters, vol. 20, No. 2, p. 75, Jan. 2008.
Larkin, Efficient nonlinear algorithm for envelope detection in white light interferometry. J. Opt. Soc. .Am. A, vol. 13, No. 4, p. 832, Apr. 1996.
Liu et al., Review of Scientific Instruments, vol. 71(3), p. 1275, Mar. 2000.
Melle et al., Practical fiber-optic Bragg grating strain gauge system. Applied Optics, vol. 32, pp. 3601-3609 (1993).
Mihailov, Fiber Bragg Grating Sensors for Harsh Environments, Sensors vol. 12, pp. 1898-1918 (2012).
Xu et al., A novel hollow glass microsphere sensor for monitoring high hydrostatic pressure, Proc. SPIE vol. 1795, 2 (1992).
Zhenguo et al., White light optical fiber EFPI sensor based on cross correlation signal processing method. Proceedings of the 6th International Symposium on Test and Measurement, Dalian, China 1 4, vol. 4, p. 3509, Jun. 2005.

OPTICAL SENSOR WITH ONE OR MORE SENSING INTERFERENCE ELEMENTS

RELATED APPLICATIONS

This Application is a divisional of and claims the benefit under 35 U.S.C. § 121 of U.S. application Ser. No. 14/385,421, entitled "OPTICAL SENSOR WITH ONE OR MORE SENSING INTERFERENCE ELEMENTS" filed on Sep. 15, 2014, which is the U.S. National Phase Application under 35 U.S.C. § 371 of International Application No. PCT/GB2013/050619, filed Mar. 13, 2013, which claims priority to United Kingdom Application No. 1204673.6, filed Mar. 16, 2012. These prior applications are incorporated by reference herein in their entirety.

BACKGROUND

The present invention relates to an optical sensor, for example an optical sensor in which one or more measurands such as temperature, pressure and/or acceleration are measured using variations in optical path difference of one or more Fabry-Perot cavities or other interference elements, which may be located together in a sensor head.

INTRODUCTION

Optical sensors implemented using one or more sensing interference elements such as Fabry-Perot cavities are known, for example from GB2002936, in which the interrogation of a two mirror Fabry-Perot pressure sensor head is realized using light of two different wavelengths delivered along an optical fibre. The ratios of the detected intensities of the two wavelengths in the back reflected light, suitably normalized using a reference feed directly from the light source, is used as a measure of optical path difference in the sensor head, which is in turn responsive to the applied pressure.

Other optical sensors based on Fabry-Perot cavities in a sensor head are described in WO2005/098385 and WO2009/077727. These documents describe sensor heads for use at high temperatures where materials such as silica glass and silicon may not be appropriate, and instead propose sensor heads fabricated using sapphire, and in some cases optically interrogated through sapphire optical fibre terminating proximally to or in contact with the sensor head. In these types of Fabry-Perot sensor heads pressure is measured by pressure-induced deflection of at least one reflective surface of a physical cavity in the sensor head. Temperature is measured by thermal expansion and thermal response of refractive index giving rise to changes in optical path length of cavities formed of material of the sensor head.

It is known to interrogate sensing interference elements in such sensors using various broad band probe light and white light interferometry techniques. However, it is difficult to implement such techniques so as to be reliable across larger ranges of variation in optical path difference of the sensing elements, for example corresponding to temperature ranges of tens or hundreds of degrees Celsius, and pressure ranges of a few atmospheres, while retaining good fine scale accuracy, for example at better than 1 degree Celsius or better than 1000 Pa.

It is also difficult to implement such techniques in practice in such a way that accurate values of optical path differences and therefore physical parameters can be determined when a sensor is started up.

It would be desirable to provide techniques which can address these and other issues with the related prior art while also assessing multiple sensing interference elements at the same time, for example in order to measure two or more physical parameters in a sensor head at the same time, or to provide compensation for the effects of one physical parameter on the measurement of another such as of temperature on measurement of pressure or acceleration.

SUMMARY OF THE INVENTION

The invention provides an optical sensor comprising: one or more sensing interference elements each having an optical path difference; an optical source arranged to deliver probe light to the one or more sensing interference elements; a spectral engine arranged to detect an interference spectrum in probe light received from the one or more sensing interference elements; a first detector function arranged to generate one or more coarse optical path difference signals, corresponding to the optical path differences of the one or more sensing interference elements, from the interference spectrum; and a second detector function arranged to generate one or more refined optical path difference signals, corresponding to the optical path differences of the one or more sensing interference elements, from the interference spectrum and the corresponding coarse optical path difference signals.

The optical source may be arranged to deliver broad band probe light to the one or more sensing interference elements, for example using a superluminescent diode. Alternatively, it could be arranged to deliver narrow band probe light, scanned over a frequency range, for example using a scanning laser source.

The optical sensor can be used for simultaneously measuring the optical path differences, of one or more measurands or physical parameters based on those path differences, from multiple sensing interference elements at the same time. It can also be used to achieve high resolution over large dynamic ranges for each of the multiple measurands. Multiple sensing interference elements can for example be combined within a single sensor head, for example to measure combinations of acceleration and temperature, pressure and temperature, or two temperatures.

The optical sensor can be used for example to measure temperatures of two parts of a sensor head, such as a diaphragm and base, simultaneously. This can provide a more accurate temperature measure for compensating measurement using another part of the sensor head, such as a pressure sensing cavity that is sandwiched in-between such a diaphragm and base. The invention can also provide for the correction of cross-sensitivities by measuring two or more measurands simultaneously, for example the temperature correction of a pressure or acceleration measurement. Some ways in which a pressure measurement can be corrected for temperature variations in an optical sensor head are described, for example, in copending patent application entitled "Optical Pressure Sensor" filed by the same assignee/applicant, on the same date, before the UK Intellectual Property Office, as the present application. The content of the copending patent application is hereby incorporated by reference in its entirety for all purposes.

The optical sensor can also comprise a third detector function, for example a dual-wavelength based detector function, to facilitate measurement of a second or third measurand, or to measure a measurand for correction or corrected using an optical path difference signal from the first and second detector functions.

The first detector function as mentioned above may be arranged to: derive an optical path difference function from the interference spectrum; locate one or more peaks in the optical path difference function, each of the one or more peaks corresponding to a different one of the one or more sensing interference elements; and generate the one or more coarse optical path difference signals from the corresponding peaks. The optical path difference signals of the corresponding peaks may be determined, for example, from the phase content of the interference spectrum.

In particular, the optical path difference function may be derived from the interference spectrum using a mathematical base function transform, or other spectral method, such as a discrete Fourier transform. This technique can have benefits of speed of calculation, for example if a fast Fourier transform is used. The first detector function may readily be used over a large dynamic range of optical path difference. However, the resolution and accuracy achieved is limited. The addition of the second detector function provides improved resolution and accuracy while maintaining a large dynamic range.

In other embodiments, the optical path difference function may be derived using an envelope or otherwise smoothed version of a cross correlation of the interference spectrum.

The second detector function may be arranged to generate said one or more refined optical path difference signals using cross correlation of the interference spectrum. For example, this may be carried out by cross correlating the interference spectrum with one or more sets of one or more periodic transfer functions. Each set of periodic transfer functions may be selected to yield the refined optical path difference signal for a selected one of said one or more sensing interference elements. In particular, the second detector function may be arranged to select each set of one or more periodic transfer functions based on the coarse optical path difference signal for the corresponding sensing interference element. The second detector function may be arranged to select each set of periodic transfer functions to correspond to a range of optical path differences encompassing the optical path difference of only a corresponding one of said sensing interference elements, or more particularly such that the cross correlation using that set contains only one peak in the cross correlation.

The second detector function may be arranged to locate a peak in the cross correlation for each set or periodic transfer functions, and to generate the one or more refined path difference signals based on the location of the peak in the cross correlation.

The optical sensor may be arranged to apply one or more variable offsets to one or more of the coarse optical path difference signals, to compensate for different rates of change of the coarse and fine optical path difference signals due to dispersion in a corresponding sensing interference element. The one or more variable offsets may be provided, for example, as a function of the one or more coarse optical path difference signals.

The optical sensor may be arranged to generate at least two coarse optical path difference signals and at least two refined optical path difference signals, corresponding to at least two sensing interference elements.

The optical sensor may be arranged, for each said sensing interference element, to output a signal indicative of a measurand or physical parameter at said sensing interference element. At least one said signal indicative of a measurand or physical parameter may be a signal indicative of one or more of temperature, pressure, and acceleration. For example, the sensor may be arranged to output signals indicative of both pressure and temperature, a pressure signal compensated for the influence of temperature at the sensing interference elements, multiple signals indicative of temperature at multiple sensing interference elements, an acceleration signal compensated for the influence of temperature at the sensing interference elements, and other combinations of measurands.

The optical sensor may comprise a sensor head, with each of said one or more interference elements being an optical cavity formed in the sensor head. The one or more interference elements may be one or more Fabry-Perot cavities formed in the sensor head. The sensor head could be constructed of sapphire, silicon, glass, polymer plastics or other materials.

The sensor head may comprise a pressure sensing optical cavity comprising a physical cavity in the sensor head, and the optical sensor may further comprise a third detector function arranged to output a signal indicative of pressure at the sensor head, based on interference of said probe light caused by said pressure sensing optical cavity. Alternatively, the sensor head may comprise an acceleration sensing optical cavity in the sensor head, for example where the sensor head includes a proof mass giving rise to changes in the optical path length of the acceleration sensing cavity under an acceleration to be detected. The optical sensor may then comprise a third detector function arranged to output a signal indicative of acceleration at the sensor head, based on interference of said probe light caused by said acceleration sensing optical cavity. In either case, the output signal may be compensated according to a temperature detected at the sensor head, for example using the first and second detector functions.

If pressure is to be detected using the above first and second detector functions, then the pressure sensing interference element must have a large enough optical path difference to be visible as a peak in the optical path difference distribution. The pressure can then be detected at high resolution and over a large dynamic range, for example by suitable compensation for temperature changes determined using a temperature sensing interference element.

The invention also provides an accelerometer comprising: a sensor head comprising a proof mass reactive to acceleration, an acceleration sensing interference element having a first optical path difference responsive to movement of said proof mass reactive to the acceleration, reaction of the proof mass to acceleration also being sensitive to temperature at the sensor head, and at least one temperature sensing element responsive to temperature at the sensor head (which may be a temperature sensing interference element and may have a second optical path difference responsive to temperature at the sensor head). The accelerometer may then also provide an acceleration detection function arranged to detect acceleration at the sensor head from the first optical path difference. The accelerometer may also provide an acceleration output compensated for temperature at the sensor head based on the temperature sensing element, for example based on the second optical path difference of the temperature sensing element. Alternatively acceleration and temperature outputs may be provided as separate outputs.

The first and second sensing interference elements may be Fabry-Perot cavities formed in the sensor head. The first sensing interference element may comprise a physical cavity in the sensor head, and the second sensing interference element comprising material of the sensor head. Alternatively, the temperature sensing element may be provided by a Bragg grating, for example located in an optical fibre coupling the sensor hear to the interrogator. Of course, various other arrangements may be used to provide the acceleration interference element and cause it to be responsive to the proof mass, which may be part of, formed on, or separately formed but coupled to some part of the acceleration interference element.

In one exemplary arrangement, the sensor head comprises a diaphragm providing a boundary of the first optical cavity, and the proof mass is arranged to cause deflection of the diaphragm reactive to acceleration. In some such examples the proof mass is formed integrally with or is comprised in the diaphragm.

The detection of acceleration may be compensated for temperature using aspects of the optical sensor set out above, wherein the at least one temperature sensing interference element is provided by said one or more sensing interference elements, and the acceleration output is compensated for temperature at the sensor head using the refined optical path difference signal from said at least one temperature sensing interference element.

The invention also provides methods corresponding to the above apparatus, for example a method of detecting an optical path difference of each of one or more sensing interference elements comprising: delivering probe light to the one or more sensing interference elements; detecting an interference spectrum in probe light received from the one or more sensing interference elements; generating one or more coarse optical path difference signals, corresponding to the optical path differences of the one or more sensing interference elements, from the interference spectrum; and generating one or more refined optical path difference signals, corresponding to the optical path differences of the one or more sensing interference elements, from the interference spectrum and the corresponding coarse optical path difference signals.

BRIEF SUMMARY OF THE DRAWINGS

Embodiments of the invention will now be described by way of example only and with reference to the drawings, of which.

DETAILED DESCRIPTION OF EMBODIMENTS

Figure 1:
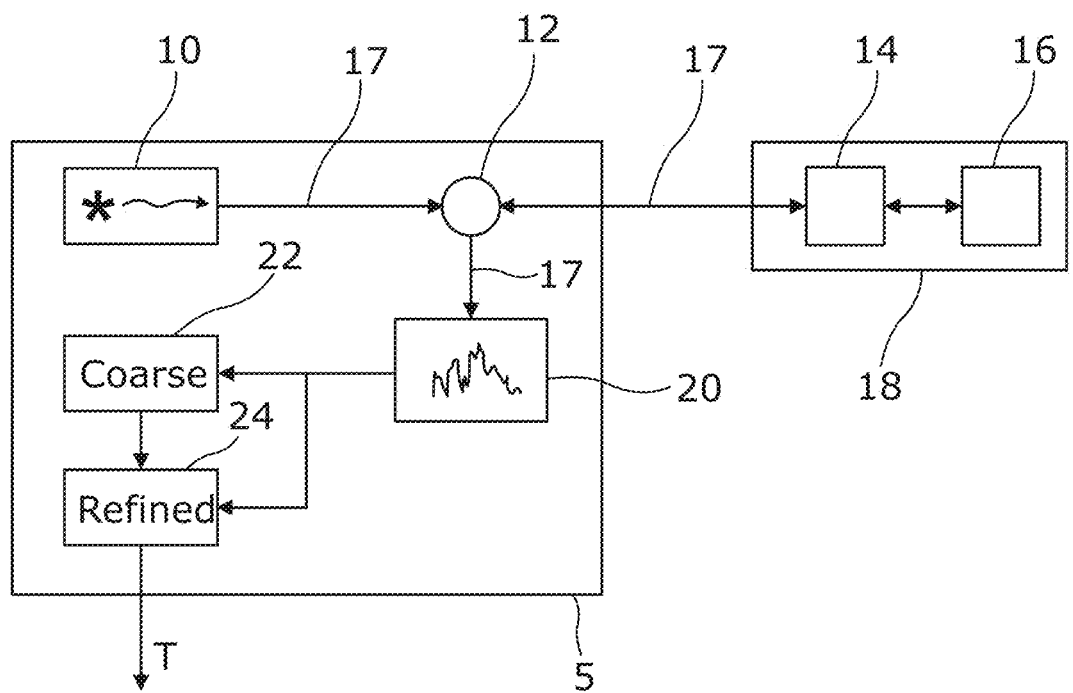
FIG. 1 shows schematically an optical sensor according to the invention.

Referring to FIG. 1 there is shown schematically an optical sensor embodying the invention. An interrogator 5 comprises a light source 10 which delivers probe light, using optical fibres 17, through an optical coupling arrangement 12 to one or more sensing interference elements 14, 16, which may be comprised for example in a sensor head 18 remote from the interrogator. Each sensing interference element 14, 16 has an optical path difference which gives rise to interference characteristics in probe light reflected back from the sensor head 18, coupled by the coupling arrangement 12, to a spectral engine 20 in the interrogator 5. The spectral engine 20 detects an interference spectrum in the probe light resulting from the one or more sensing interference elements 14, 16.

The light source may be a broad band light source such as a super-luminescent diode, and the spectral engine 20 may then incorporate a spectrometer. A suitable super-luminescent diode could have a central wavelength in the region of 1550 nm, and an optical bandwidth of around 80 nm. Alternatively, a laser source of much narrower optical bandwidth could be used, the laser source being scanned in frequency, in which case a detector such as a photodiode may be used by the spectral engine in combination with a link between the light source 10 and the spectral engine 20 so that a spectrum of the reflected probe light over the scanned frequency range may be obtained. The spectral engine may typically output an intensity or power spectrum corresponding approximately to the wavelength range of the light source, for example with 512 or 1024 spectral data points evenly spaced in wavelength over this range.

The interference spectrum is passed from the spectral engine 20 to a first detector function 22 which is arranged to generate a coarse optical path difference signal in respect of each sensing interference element 14, 16 contributing to the interference spectrum. The coarse optical path difference signal is passed to a second detector function 24 which uses this and the interference spectrum to generate a refined or fine optical path difference signal. The refined optical path difference signal may be used by the second detector function 24 or some other function of the interrogator 5 to generate one or more signals indicative of one or more measurands at the sensor head 18 or more particularly at the one or more sensing interferometer elements 14, 16, such as an output of temperature "T" at the sensor head 18 shown in FIG. 1. Operation of the first and second detector functions will be described in more detail later.

The general arrangement of FIG. 1 may be used to provide one or more signals representative of one or more measurands at sensor head in a variety of different combinations. In addition to providing a signal representative of any one measurand at the sensor head, such as temperature, pressure or acceleration, a single output signal may combine two or more measurands. Examples of this include a pressure signal or an acceleration signal compensated for temperature, a temperature gradient or other compound temperature signal based on two or more separate temperature measurements, and a dynamic or acoustic pressure signal compensated for static pressure. In addition, multiple signals representative of two or more measurands at the sensor head, such as: two temperatures; temperature and pressure; static pressure and dynamic pressure; temperature, pressure and acceleration, or any other suitable combination, may be generated and output.

In one particular example, a heat flux signal could be output by combining two or more measurements of temperature at two different parts of a sensor head, and combining these using known physical properties of the sensor head.

The interference elements could take a wide variety of forms including Fabry-Perot cavities, Michelson interferometer elements, Mach-Zehnder interferometer elements and so forth, and could operate by either or both of reflection and transmission of the probe light. If two or more interference elements are used, these may be located in a common sensor head or in separate physical units, and may be proximate, adjacent or distant from each other. The interference elements can be separated, adjacent, and/or overlapping.

Figure 2:
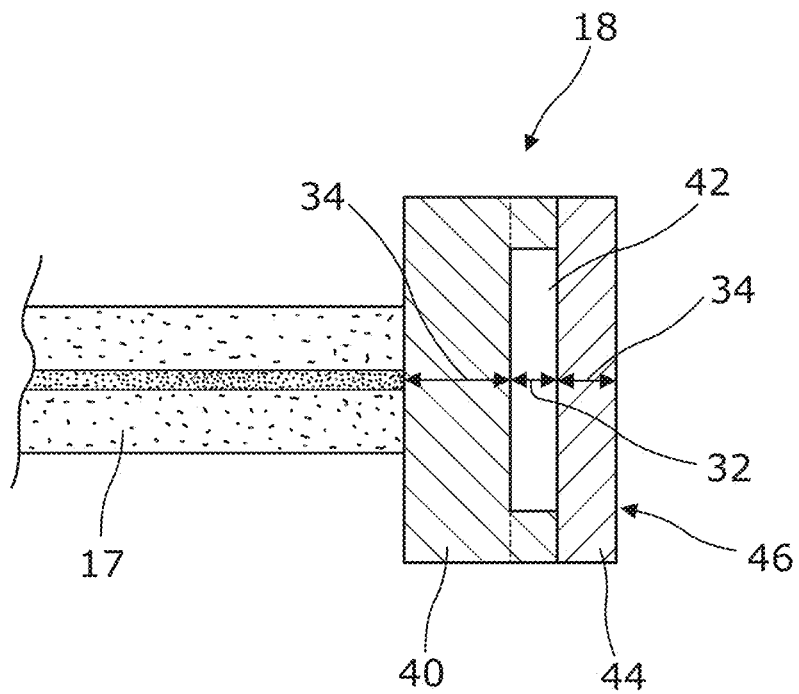
FIG. 2 illustrates in cross section a sensor head comprising sensing optical cavities which may be used to provide the sensing interference elements of FIG. 1.

An example sensor head 18 suitable for use with the optical sensor of FIG. 1 is shown in FIG. 2. Similar sensor heads are discussed in WO2005/098385 and WO2009/077727 which are hereby incorporated by reference. For operation at high temperatures, for example in excess of 1000° C., the sensor head may be fabricated from sapphire as also discussed in WO2005/098385 and WO2009/077727. However, the sensor head may be fabricated from other suitable dielectric materials which are sufficiently transparent to the probe light at the required temperatures of operation, for example from silicon, other semiconductors, glass materials and polymer plastics materials, depending on the desired application and conditions of operation.

The example sensor head illustrated in FIG. 2 comprises a substrate 40 into which is etched or otherwise formed a recess 42. The recess is capped using a membrane or diaphragm layer 44, typically of the same material as the substrate 40. The recess 42 may be filled, for example, with a low pressure inert gas. External pressure on the sensor causes deflection of the membrane 44 relative to the substrate 40, thereby changing the depth of the recess 42 slightly. The depth of the recess may typically be from a few μm to a few tens of μm, and the thickness of the substrate may typically be a few hundred μm. The thickness of the membrane 44 may be selected depending on its diameter, the mechanical properties of the material used, and the range of pressures which are to be measured, so as to provide a deflection range under that range of pressures which can be suitably detected by the interrogator 5, but might typically be from a few tens of μm to a few hundred μm in thickness, and a few thousand μm in diameter.

The sensor head 18 may coupled to the interrogator 5 by being in direct contact with an end of an optical fibre 17 or of a length of optical fibre coupled in turn to optical fibre 17, for example being fusion bonded to the optical fibre, or may be spaced from the end of the optical fibre in various ways, for example as discussed in W 02009/077727.

In the example sensor head 18 of FIG. 2, a pressure sensing optical cavity 32 is provided by a Fabry-Perot cavity formed from the opposing major surfaces of the cavity formed by the recess 42 capped by the membrane. One or more temperature sensing optical cavities 34 are provided by optically reflective surfaces of the substrate and/or of the membrane 44 forming one or more Fabry-Perot cavities, as shown in the FIG.

If the diaphragm or membrane 44 of FIG. 2 has thickness t and is deflected by an applied pressure p and the resulting centre deflection y from the undeflected cavity size c is measured optically as cavity size (c−y), then for y≪t, the relationship between applied pressure and centre deflection for smaller deflections is linear and given by the following equation:

$$y = \frac{3(1-v^2)R^4}{16Et^3} p$$

where R is the diaphragm radius, and E and v are Young's modulus and Poisson's ratio of the diaphragm material, respectively. However, the absolute size of the cavity c is also a function of temperature governed mainly by the thermal expansion of the rim material. Hence, for the sensor to function as an absolute pressure sensor the temperature information is required. Temperature can be measured simultaneously via measuring the optical path difference of either or both temperature sensing optical cavities 34 as described elsewhere herein. Hence, accurately measuring the temperature facilitates the compensation of absolute pressure measurement errors due to temperature.

More generally, the various optical cavities provided by the sensor head 18 may be formed in various ways in the sensor head 18. Typically, the pressure sensing optical cavity 32 will be partly or entirely provided by a physical cavity in the solid material of the sensor head so that the length of this cavity changes predominantly under the influence of external pressure. Each of the at least one temperature sensing optical cavities will typically provided partly or entirely by solid material of the sensor head so as to change optical length under influences of temperature due to thermal expansion and temperature effects on refractive index of the solid material without being dominated by changes in pressure. The pressure sensing optical cavity 32 will also change length under the influence of changes in temperature, for example due to thermal expansion of the solid material of the substrate 40 which supports the membrane 44.

The various surfaces of the Fabry-Perot or other optical cavities or other sensing interference elements in the sensor head may be polished and/or provided with one or more coatings to change or enhance the reflective properties of the surfaces. Surfaces of the Fabry-Perot or other types of optical cavities may be provided by boundaries of the material forming the sensor head, but may also be formed where appropriate by boundaries between different materials within the sensor head, for example at a boundary of two materials having different refractive index.

As exemplified in FIG. 2, the one or more temperature sensing optical cavities 34 may be located adjacent to the pressure sensing cavity 32. Typically, on outside surface 46 of the membrane 44 may exposed to high temperatures such that the gradient of temperature across the sensor head is significant. Locating the temperature sensing cavities close to the pressure sensing cavity allows detection of temperature to be a more accurate measure of the temperature influencing the optical length of the pressure sensing cavity 32. Use of two or more temperature sensing cavities, for example on either side of the pressure sensing cavity as shown in FIG. 2, also allows a more accurate measure of the temperature influencing the optical length of the pressure sensing cavity 32, for example by averaging the temperatures measured using the two temperature sensing cavities or using a more complex calculation.

Figure 3:
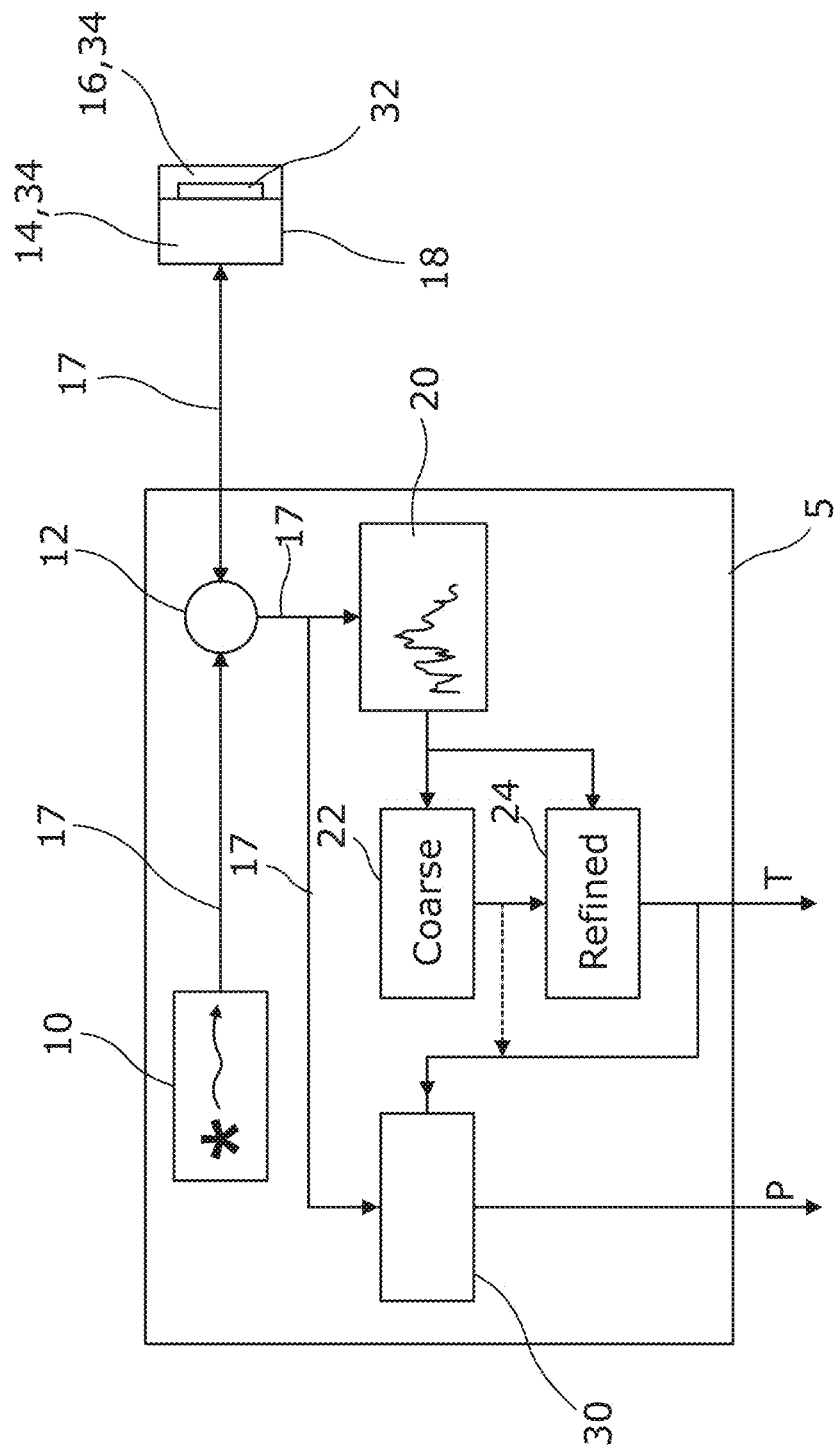
FIG. 3 shows a modification to the arrangement of FIG. 1 to include a third detector function, for example to detect pressure or another parameter at the sensor head using a technique such as a dual wavelength interrogation scheme.

FIG. 3 shows an extension to the arrangement of FIG. 1 in which a sensor head 18 having a pressure sensing interference element such as that of FIG. 2 is used and the pressure sensing optical cavity 32 is interrogated by a third detector function. First and/or second interference elements 14, 16 are provided by temperature sensing optical cavities 34 of FIG. 2, and the optical path differences of these cavities are interrogated using the spectral engine 20, and the first and second detector functions 22, 24, to derive a temperature at the sensor head 18. This could be a temperature of a single temperature sensing optical cavity based on temperature induced variations in the physical length and refractive index of that cavity, or an average or other combination of such temperatures from two temperature sensing cavities.

The pressure sensing optical cavity 32 is interrogated by a third detector function 30 adapted to detect optical path difference variation using a different technique to that illustrated in FIG. 1. In particular, probe light routed by the coupler 12 to the third detector function may be filtered to detect two distinct wavelengths for separate detection by two photodetectors. The signals from the photodetectors may be normalised if necessary by use of similar signals derived from probe light not having passed to the sensor head 18, before being fed to a comparator for analysis to generate a pressure sensing cavity output signal representative of the optical length and/or changes in the optical length of the pressure sensing optical cavity 32 of the sensor head 18. This arrangement is not shown in detail in the FIG., but can be achieved, for example, by following the techniques taught in the prior art such as in GB2202936. Having derived a signal representative of the optical path length of the pressure sensing optical cavity 32, this can then be adjusted or compensated for variations in the cavity length due to temperature using a temperature signal from or derived from the output of the first or second detector functions. The interrogator 5 may then use the compensated signal to output a signal representative of pressure P at the sensor head 18 or similar.

The third detector function may be used in combination or separately and in addition to the first and second detector functions to generate and output a variety of other combinations of one or more measurand signals. For example, the interrogation 5 may output only a pressure signal, based on a temperature signal from the first and second detector functions being used to refine a pressure signal at the third detector function, or only an acceleration signal, similarly based on a temperature signal from the first and second detector functions being used to refine an acceleration signal at the third detector function, or such a refined pressure or acceleration signal or other measurand signal output from the third detector function in addition to one or more other measurand signals output from the first and second detector functions, or other groups of separately detected, inter-compensated or combined measurands, for example as discussed elsewhere herein.

Figure 4:
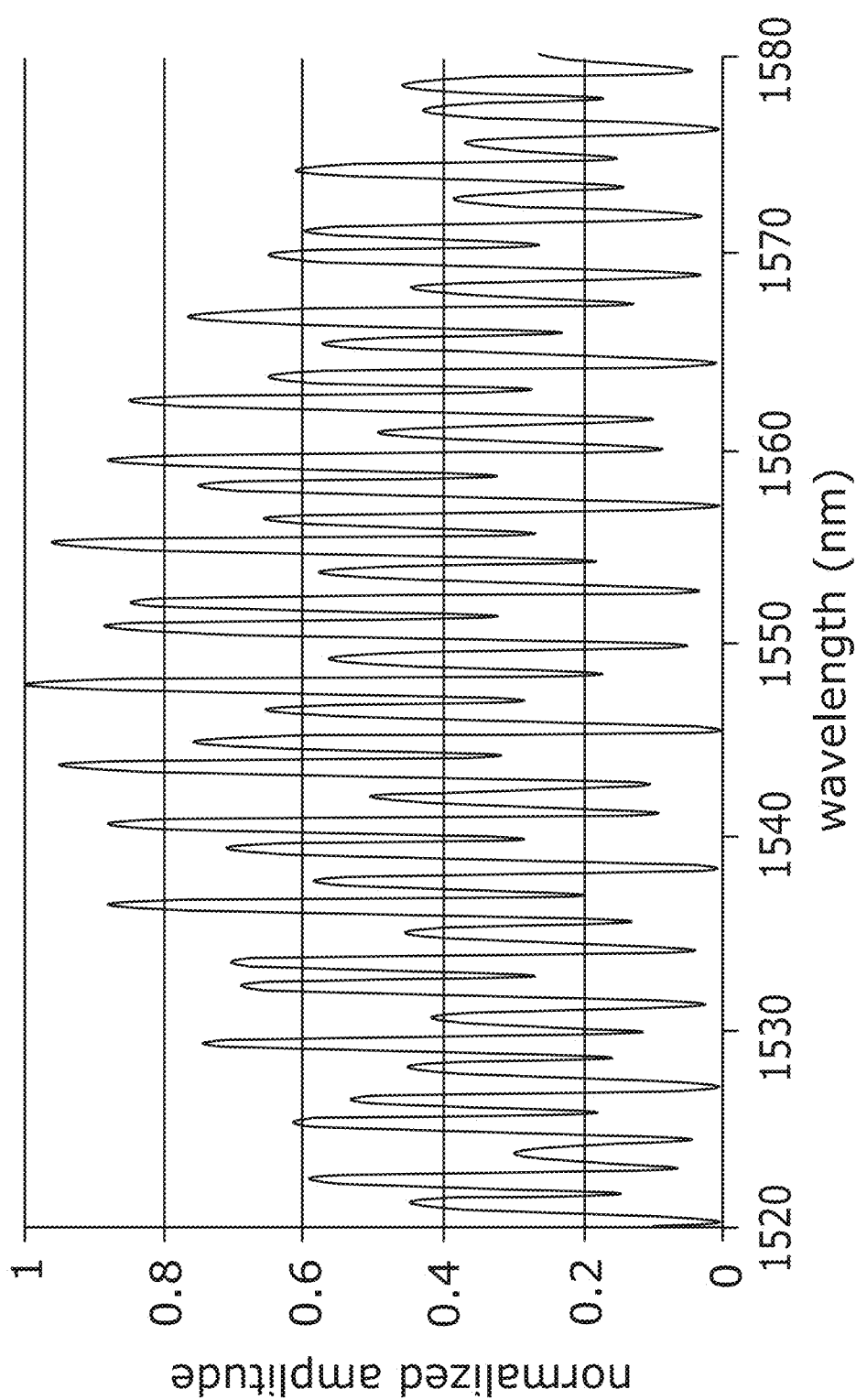
FIG. 4 shows an interference spectrum detected at the spectral engine of FIG. 1 or 3.
Figure 5:
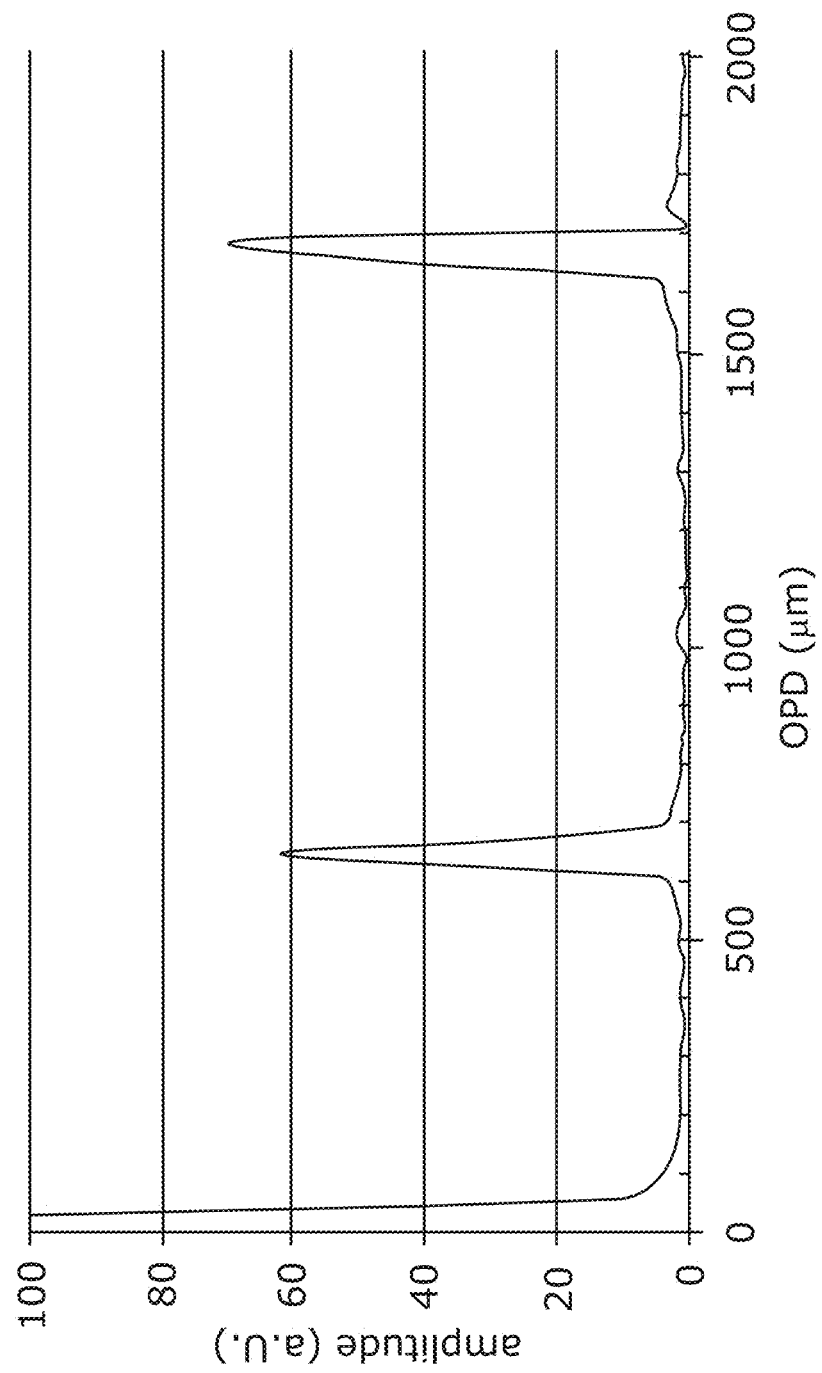
FIG. 5 shows an optical path difference distribution derived from the interference spectrum of FIG. 4 using a fast Fourier transform.

FIG. 4 illustrates an interference spectrum detected by the spectral engine 20, for example when coupled with a probe light source 10 emitting broadband probe light and a sensor head such as that of FIG. 2. The interference spectrum consists essentially of a superposition of periodic functions, each periodic function having a periodicity corresponding to the optical path difference of one of the sensing interference elements 14, 16. As discussed above in connection with FIGS. 1 and 3, the interference spectrum detected by the spectral engine 20 is passed to the first detector function 22 which generates a coarse optical path difference signal for each sensing interference element. This can be done, for example by using a discrete Fourier transform applied to the interference spectrum to obtain an optical path difference distribution, for example as illustrated in FIG. 5. Other ways of generating an optical path difference distribution for use in determining a coarse optical path difference signal may be used, for example by employing a cross-correlation function as discussed below in connection with the operation of the second detector function, and calculating the peak of its envelope by employing, for instance, a Hilbert transform as explained in more detail below.

FIG. 5 shows such a distribution derived from the interference spectrum of FIG. 4, plotted as a relative amplitude against a measure of optical path difference in micrometers, although it should be noted that the relationship of the optical path difference scale of the distribution to the actual optical path difference of the sensor interference elements as shown in the graph may only be approximate. Two peaks corresponding to the two sensing interference elements 14, 16 having optical path differences of about 630 and 1670 micrometers are clearly visible. The peak which would correspond to a much smaller optical path difference of pressure sensing optical cavity 32 shown in FIG. 2 is not visible, being subsumed into the DC contribution to the left of the graph.

Using the optical path difference distribution, the first detector function may locate and/or isolate the one or more peaks corresponding to the one or more detected sensing interference elements, use numerical methods familiar to the person skilled in the art to locate the central or highest point of each peak, thereby arriving at a coarse optical path difference signal corresponding to the peak position for each detected sensing interference element. More particular and potentially more accurate ways of arriving at a coarse optical path difference signal can be implemented for example by following Liu and Fernando, Review of Scientific Instruments, volume 71, page 1275, March 2000, or Y. Jiang, IEEE Photonics Technology Letters, vol. 20, No. 2, January 2008, p 75. In one such method, discussed in Egorov et al., Proc SPIE, vol 3201, 44 (1997), an evenly spaced array of optical frequencies is created from the wavelength array used for the interference spectrum output by the spectral engine, with new amplitudes for the spectrum in the new array being calculated by interpolation. A fast Fourier transform (FFT) of the interpolated spectrum is then taken to provide the optical path difference distribution. The sensing interference element of interest is then selected by filtering out any other peaks, which can be done automatically without difficulty if the approximate sizes of each of the elements are known. After filtering, an inverse FFT is taken followed by the natural logarithm, resulting in an array of complex numbers. The imaginary part of each of these complex numbers represents the optical phase for each optical frequency point. Applying a phase unwrapping algorithm then results in a linear relationship between phase and frequency, the slope of which is proportional to the optical path difference of the selected peak and sensing interference element.

As discussed above in connection with FIGS. 1 and 3, the interference spectrum detected by the spectral engine 20 is also passed to the second detector function 24 along with the coarse optical path difference signal for each sensing interference element, in order to generate a refined optical path difference signal for each sensing interference element. This can be done using a cross correlation between the interference spectrum and selected periodic transfer functions. Typically, such periodic transfer functions are simplified theoretical transmittance or reflectance functions of the sensing interference elements, and suitable techniques for carrying out the cross correlation are described for example in Zhengou and Qingxu, Proceedings of the 6$^{th}$ International Symposium on Test and Measurement, Dalian, China 1-4 Jun. 2005, volume 4, page 3509, 2005.

The cross correlation could, for example be represented as follows:

$$T(OPD, \lambda) = 1 - \cos\left(\frac{2\pi OPD}{\lambda}\right),$$

$$CCF(OPD) = \sum_{i=0}^{N-1} \tilde{A}_i T(OPD, \lambda_i) = \sum_{i=0}^{N-1} \tilde{A}_i \left\{1 - \cos\left(\frac{2\pi OPD}{\lambda_i}\right)\right\}$$

where T is the periodic transfer function corresponding to a particular optical path difference OPD at each wavelength of the probe light $\lambda$, CCF is the cross correction function, $A_i$ is the amplitude of the interference spectrum at each wavelength $\lambda_i$ in the range i=0 to N−1.

Figure 6:
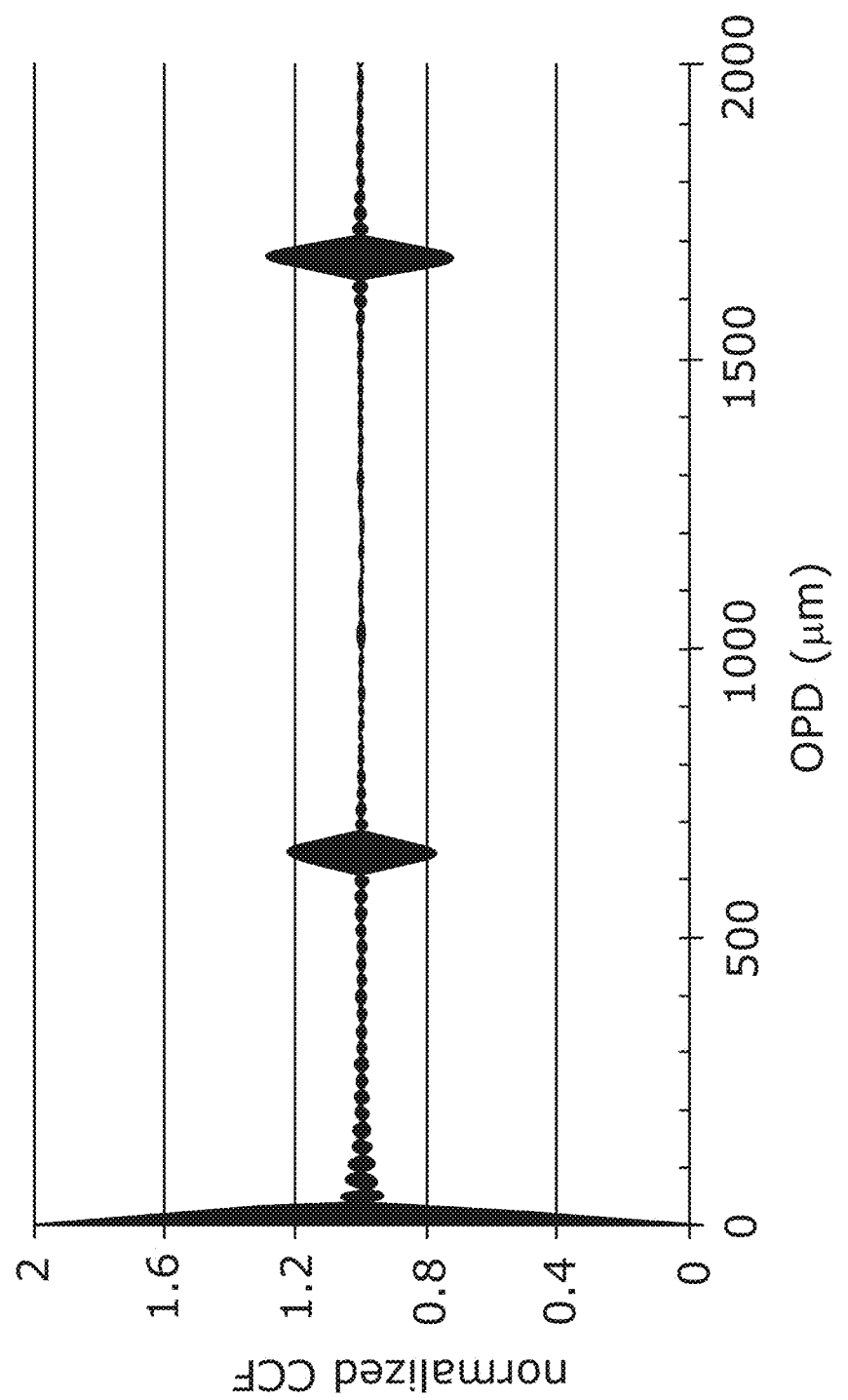
FIG. 6 shows a cross correlation derived from the interference spectrum of FIG. 4 using a set of transmittance or transfer functions representative of a distribution of optical path differences.
Figure 7:
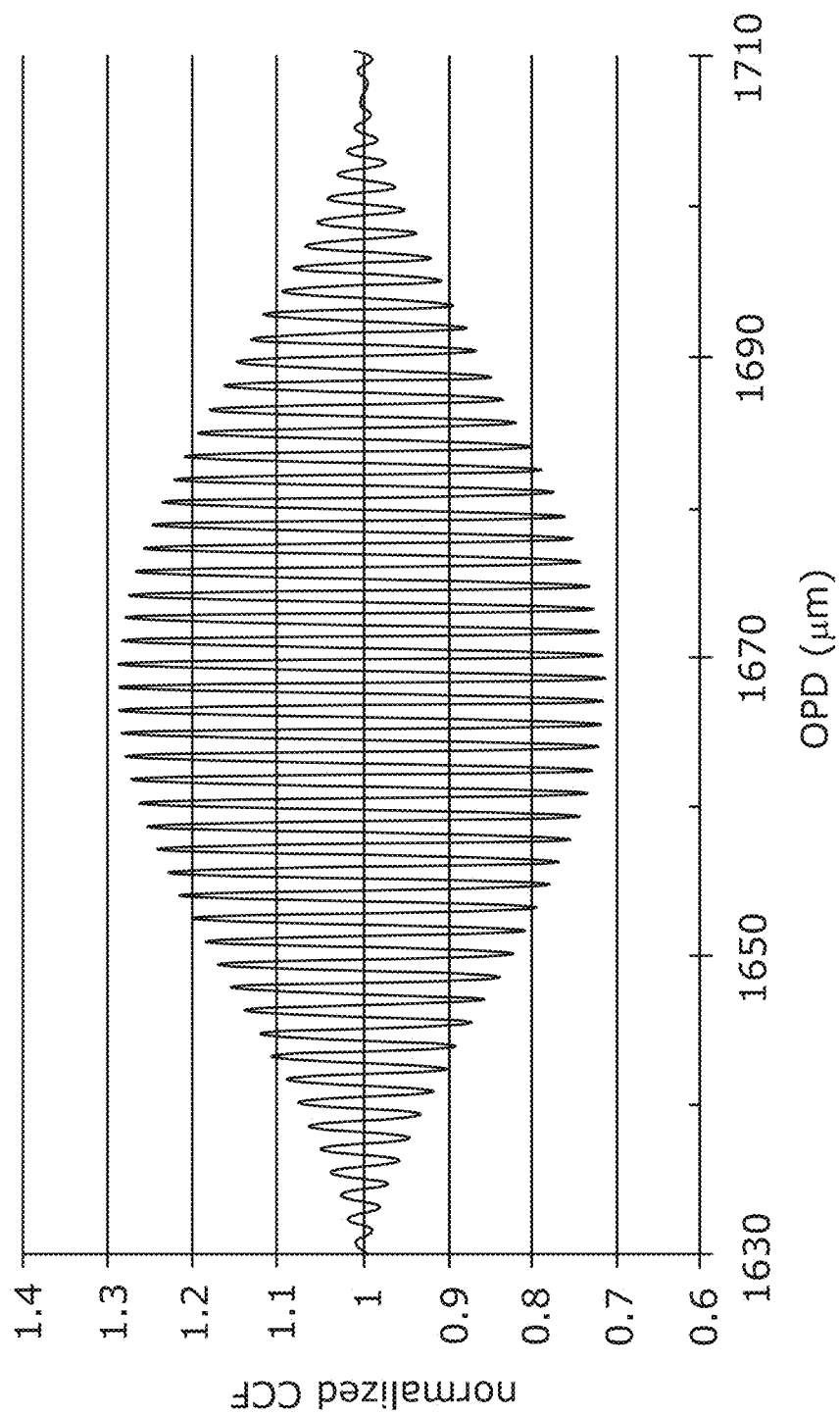
FIGS. 7, 8 and 9 show with increasing detail parts of the graph of FIG. 6.
Figure 8:
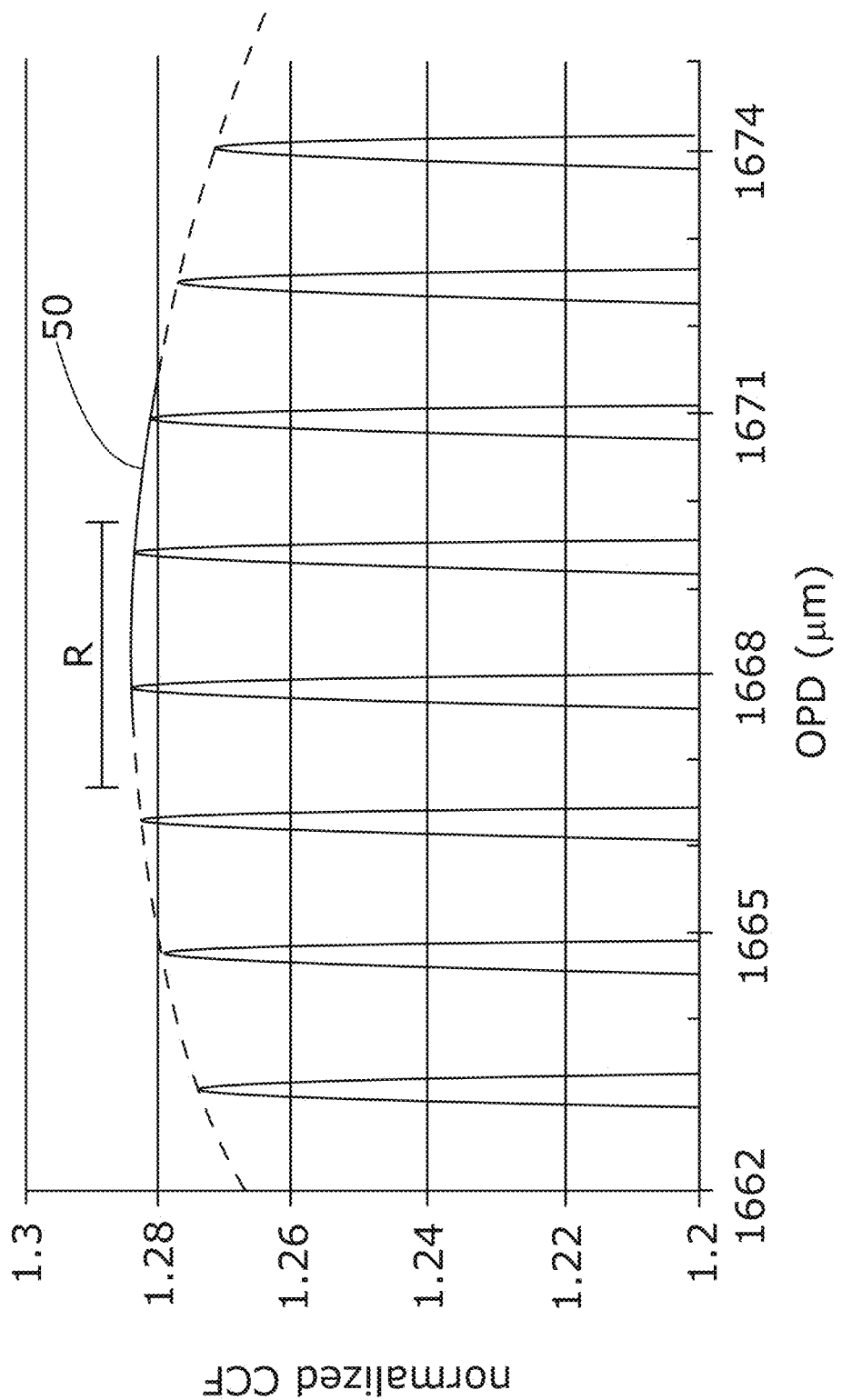
Figure 9:
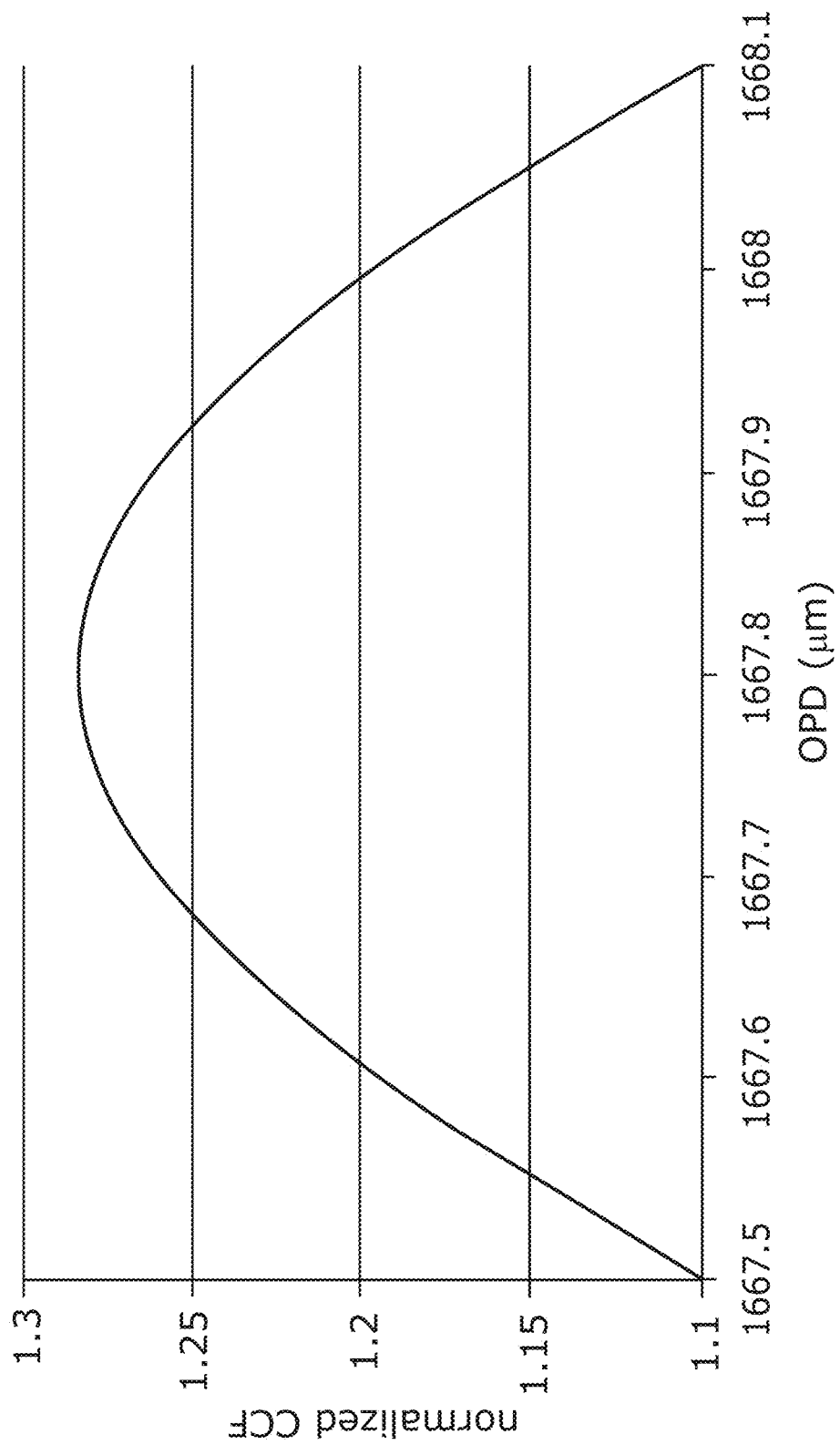

The results of a cross correlation of the interference spectrum, with a set of periodic transfer functions corresponding to a full range of optical path differences covering all sensing interference elements is illustrated in FIG. 6, in which peaks for the sensing interference elements can be seen at positions corresponding to the peaks in the optical path difference distribution of FIG. 5. As for FIG. 5, the abscissa is expressed in terms of optical path difference, while the ordinate is a normalized value of the cross correlation result. FIG. 7 shows the results of the cross correlation using a selected set of periodic transfer functions selected to approximately correspond to the position of the sensing interference element having an optical path difference of about 1670 micrometers. It can be seen that the result of the cross correlation is a series of fine correlation peaks, only the envelope of which can be seen in FIG. 6. The fine correlation peaks arise from the use of a broadband probe light source, or alternatively from scanning the probe light across a wavelength band to provide the interference spectrum. FIG. 8 shows the results of a still more limited selection of periodic transfer functions around the 1670 micrometer peak, and FIG. 9 shows the result of carrying out the cross correlation using a set of periodic transfer functions corresponding to optical path differences which encompass only one of the fine correlation peaks. From the data illustrated in FIG. 9 an optical path difference change of the order of 0.01 μm, 0.001 μm, or less can be detected without difficulty by the second detector function by tracking movement of a peak.

Embodiments of the second detector function can implement the cross correlation in various ways. If the approximate position of the fine correlation peak to be tracked is known with reasonable accuracy, for example from the coarse optical path difference signal, use of a very limited set of periodic transfer functions can be used to track the position of a single fine correlation peak, and in principle just one such function could be used by monitoring the rising and falling signal at one side of a correlation peak. Using two or three such periodic transfer functions enables the position of the peak to be established with considerable accuracy. Typically, the set of transfer functions used by the second detector function to track a fine correlation peak will correspond to an optical path difference range of only one such peak, or less.

Clearly, the finesse of the fine correlation peak around 1667 micrometers in FIG. 9 can be used to obtain a very accurate determination of optical path difference of a selected sensing interference element, which is typically much more accurate than using the coarse optical path difference signal from the first detector function alone. For a sensing interference element which is non dispersive or of very low dispersion, for example in the case of a sapphire optical cavity at near infrared wavelengths, a selected one of the cross correlation peaks will move in very close correspondence with the corresponding peak in the optical path difference distribution used by the first detector function. For situations where one or more of the sensing interference elements are dispersive, additional techniques can be used to improve accurate tracking of a single cross correlation peak by the second detector function.

Instead of employing a discrete Fourier transform based method as discussed above to derive an optical path difference distribution for use by the first detector function, the optical path difference distribution for use by the first detector function can be formed from an envelope of a cross correlation between the interference spectrum and periodic transfer functions representing optical path differences across at least a part of a peak corresponding to a sensing interference element in the interference spectrum. Suitable cross correlations are already discussed above in connection with FIGS. 6, 7 and 8 and the second detector function. A suitable cross correlation envelope is shown as broken curve 50 in FIG. 8. A suitable range of optical path difference over which to carry out cross correlation of the interference spectrum, in order to provide a coarse optical path difference signal, may be of the order of the distance between one or a few cross correlation function peaks, for example shown as range R in FIG. 8.

A suitable envelope of the cross correlation, over a suitable range of optical path difference for use by the first detector function can be calculated, for example, by using a Hilbert transform H( ), for example as discussed in "Signal Analysis", A. Papoulis, McGraw-Hill 1977. Noticing that the non-oscillating part of the cross correlation function equals one (see FIG. 7), one can separate the oscillating part by subtracting the constant value of one. Denoting the cross correlation with a transfer function representing a particular optical path difference as x, the varying part equals x−1. Applying the Hilbert transform results in phase shifting the x−1 curve by π/2. Hence, squaring the original x−1 and the phase shifted H(x−1) parts results in separating a common envelope factor in front of the corresponding sine and cosine parts. Therefore, the envelope can be calculated as follows:

$$\text{Envelope(OPD)} = \sqrt{(x-1)^2 + (H(x-1))^2} + 1$$

To avoid edge effects yielding large unphysical oscillations it may be necessary to apply the Hilbert transform over a large range of the cross-correlation, for example over substantially the whole range illustrated in FIG. 7.

Other schemes for obtaining a suitable envelope have been discussed in the literature, for instance Kieran G. Larkin, 'Efficient nonlinear algorithm for envelope detection in white light interferometry' J. Opt. Soc. Am. A, Vol. 13, No. 4, April 1996, p. 832.

Having established a suitable optical path difference distribution using an envelope of a cross correlation of the interference spectrum, a coarse optical path difference signal can be generated, for example, by detecting the position of a peak in the envelope corresponding to a relevant sensing interference element.

Figure 10:
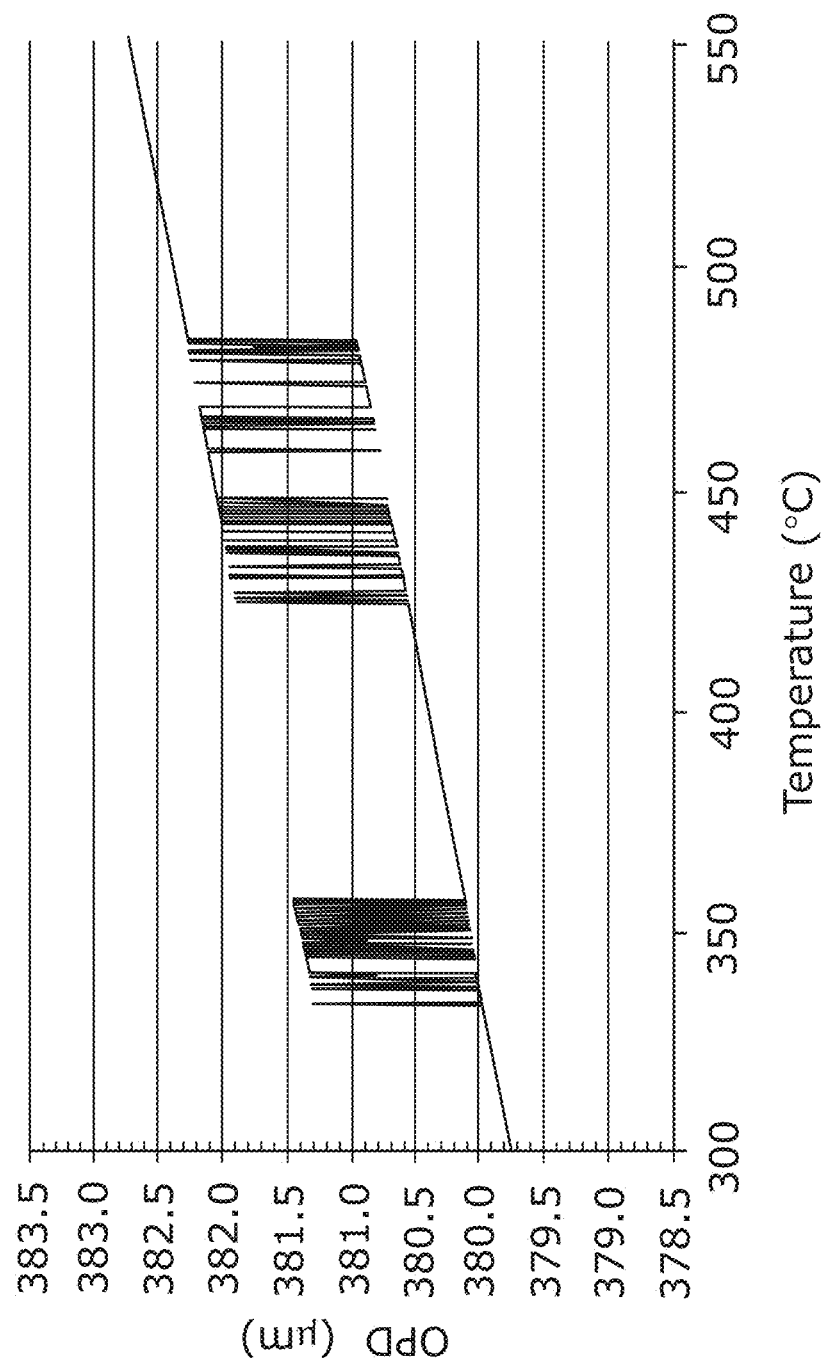
FIG. 10 illustrates the problem of jumping between different fine cross correlation peaks of a cross correlation method of tracking the optical path difference of a sensing interference element.

Without use of the first detector function to provide an approximate position and approximate variations in the optical path difference as measurable from the cross correlation, it would become difficult for the second detector function to consistently track a single cross correlation peak. A result of this prior art deficiency is illustrated in FIG. 10, which shows the results of a calibration test of a similar cross correlation arrangement to that of FIGS. 1 and 3, without the use of a coarse optical path difference signal to ensure that a single cross correlation peak is tracked. It can be seen that, as a sensing interference element is subjected to a rising a calibration temperature in the range from 300 to 550 degrees Celsius, the optical path difference as determined using the cross correlation scheme spends some time clearly tracking one of two cross correlation peaks, and other parts of the calibration run jumping between the two different peaks. The overall result in FIG. 10 is that the tracking of the optical path difference, even for the weakly dispersive sensing interference element used in this example, can only be accurate to about 1.5 µm over an extended temperature range of more than a few tens of degrees Celsius.

The use of first and second detector functions also enables the interrogator to identify the correct fine correlation peak to lock onto and track when the sensor is started up, and enables the correct fine correlation peak to be tracked reliably over a wide range of variations in optical path difference driven for example by wide variations in temperature and/or pressure, depending upon what physical parameters the sensing interference elements are designed to be sensitive to.

Having determined a measure of the optical path difference of a sensing optical cavity, a physical parameter such as temperature or pressure at the sensing head 18 can be determined and output by the interrogator 5. For example in the case of a sensor head made of sapphire, temperature measurement can be established by noting that both the group refractive index of sapphire and the geometrical thickness of an optical cavity formed of the sapphire material are unambiguous functions of temperature, so that by determining a refined optical path difference signal as a function of an applied calibration temperature, calibration can be established. Other parameters can be determined depending upon suitable design of the sensing interference elements, such as pressure and stress. For a sensor head such as that of FIG. 2, pressure measurement can be established from the movement of a diaphragm or membrane as discussed in detail earlier in this document.

Figure 11A:
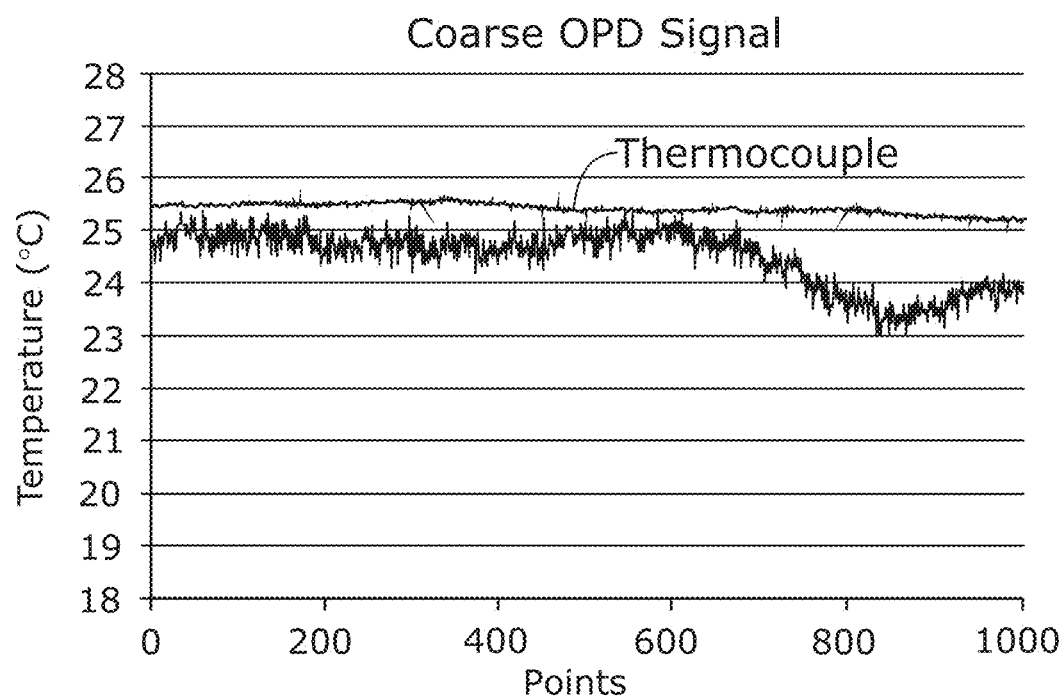
FIGS. 11A and 11B compare temperatures derived from coarse and refined optical path difference signals generated using the first and second detector functions of FIG. 1 or 3, with comparative thermocouple measurements.
Figure 11B:
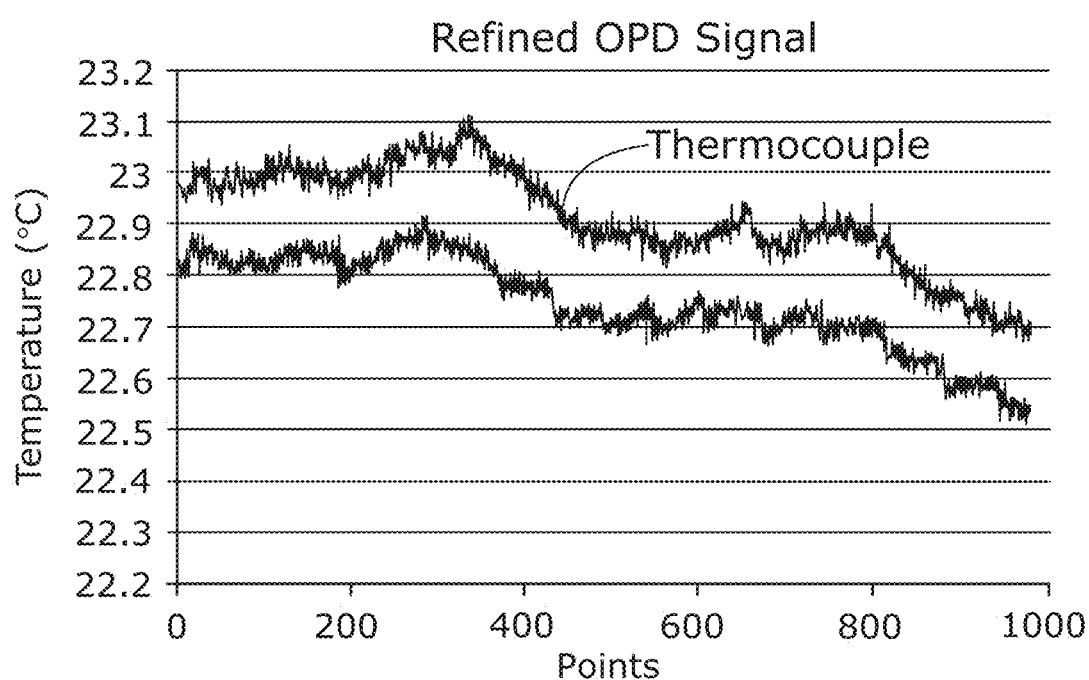

Temperatures derived directly from coarse and refined optical path difference signals output by the first detector function and second detector function respectively in a calibration test using a sapphire sensor head similar to that of FIG. 2 are shown in FIGS. 11A and 11B. It can be seen that the temperature based on the refined optical path difference signal is considerably less noisy than that based on the coarse signal, as expected. Simultaneous thermocouple measurements are shown for comparison. The refined OPD signal provides about a tenfold improvement in temperature measurement over the coarse OPD signal, because an individual cross correlation peak can be tracked much more accurately than a peak in the FFT or cross correlation envelope.

The arrangements of FIGS. 1 and 3 can be readily applied to simultaneously detect optical path differences of more than one sensing interference element, such as two or more Fabry-Perot cavities of a sensor head as illustrated in FIG. 2. A single interference spectrum detected by the spectral engine 20 can be used by the first and second detector functions to provide two or more coarse optical path difference signals and two or more refined optical path difference signals at the same time, corresponding to two or more sensor interference cavities. In this way, two or more physical parameters can be detected at the same time, for example two temperature measurements at different positions, or a combination of temperature and pressure.

For situations where one or more of the sensing interference elements are dispersive to a significant extent, additional techniques can be used to improve accurate tracking of a single cross correlation peak by the second detector function. This may occur, for example, if the sensor head 18 is made of silicon instead of sapphire. The movement of peak in a Fourier transform or suitably enveloped cross correlation of the interference spectrum, as detected by the first detector function and corresponding to a particular sensing interference element, is largely related to the group refractive index of that element, whereas movement of the fine peaks in the cross correlation function used by the second detector function is largely related to the phase refractive index of the element. Therefore, if the dispersion of the interference element is sufficiently large, that is the difference between the group and phase refractive indexes is sufficiently large, then the peak detected by the first detector function moves at a significantly different rate to that detected by the second detector function. This can give rise to the second detector function failing to track a single peak over extended changes in optical path difference. The effect is similar to that illustrated in FIG. 10, except that for highly dispersive materials the second detector function may jump between a much larger number of peaks over an extended range of optical path differences. Unfortunately, the exact positions of jumps by the second detector function from one correlation peak to the next is not accurately reproducible, so cannot easily be calibrated out.

This problem can be solved by applying an offset to one or more of the coarse optical path difference signals, to compensate for different rates of change of the coarse and fine optical path difference signals due to dispersion in a corresponding sensing interference element. In particular, the offset may be a variable offset to yield an adjusted coarse optical path difference signal, the offset for example varying or increasing linearly or according to some other analytical function with the coarse optical path difference signal. The variable offset then ensures that the adjusted coarse optical path difference signal causes the second detector function to track a single correlation peak over an extended range of optical path difference variation in the sensing interference cavity. The variable offset effectively compensates for the difference between the rates of change of optical path difference in phase and group terms of the sensing interference element under the same driving parameter change such as change of temperature. Typically, the variable offset will be different for each of two or more respective coarse and refined optical path difference signals. The variable offset may be applied by the first detector function, such that the coarse optical path difference signal received by the second detector function already includes the offset.

Figure 12:
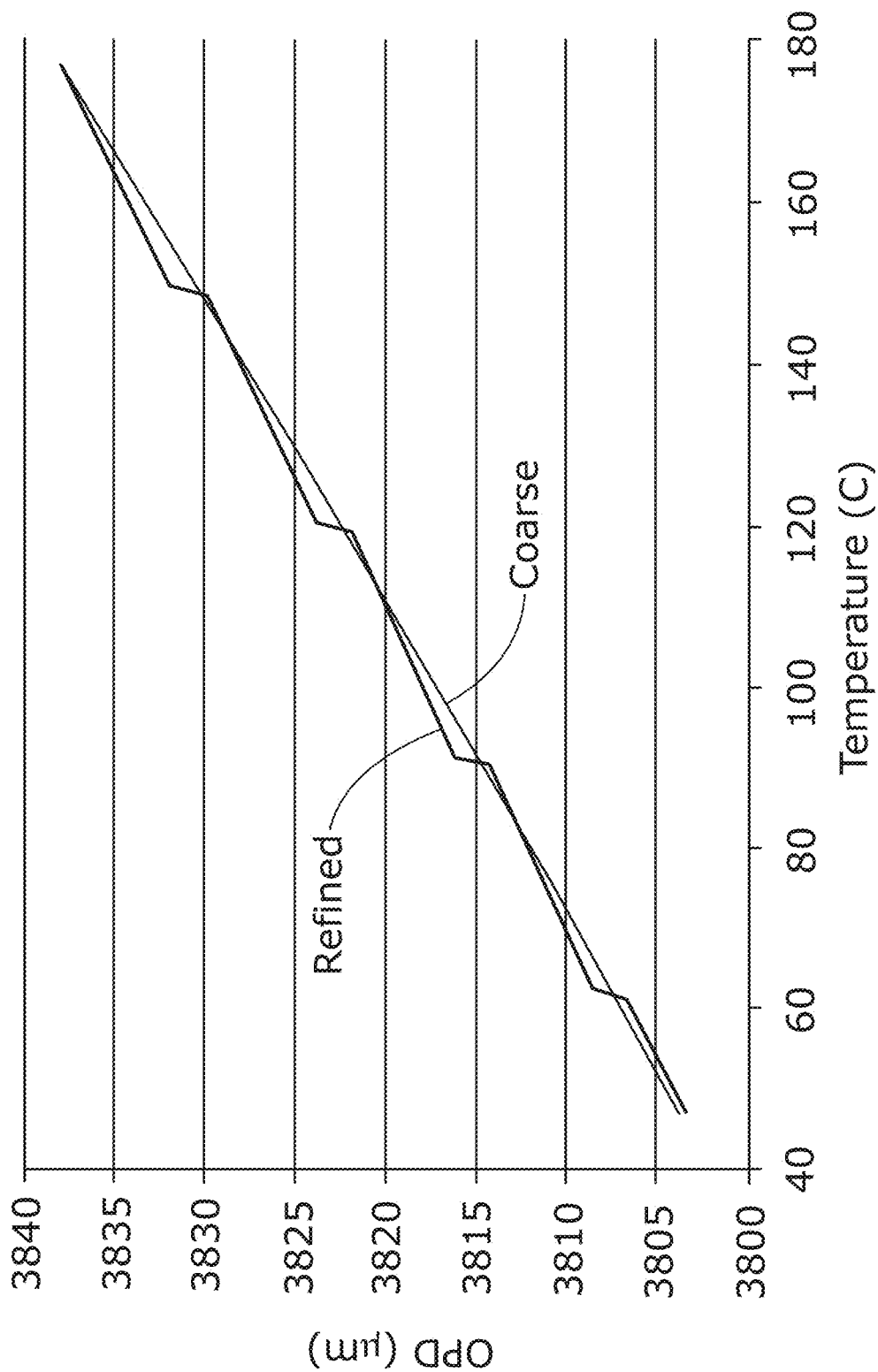
FIG. 12 compares refined and coarse optical path difference signals generated using the first and second detector functions of FIG. 1 or 3 in which dispersion at the sensing interference element leads to errors in tracking a correlation peak by the second detector function.
Figure 13:
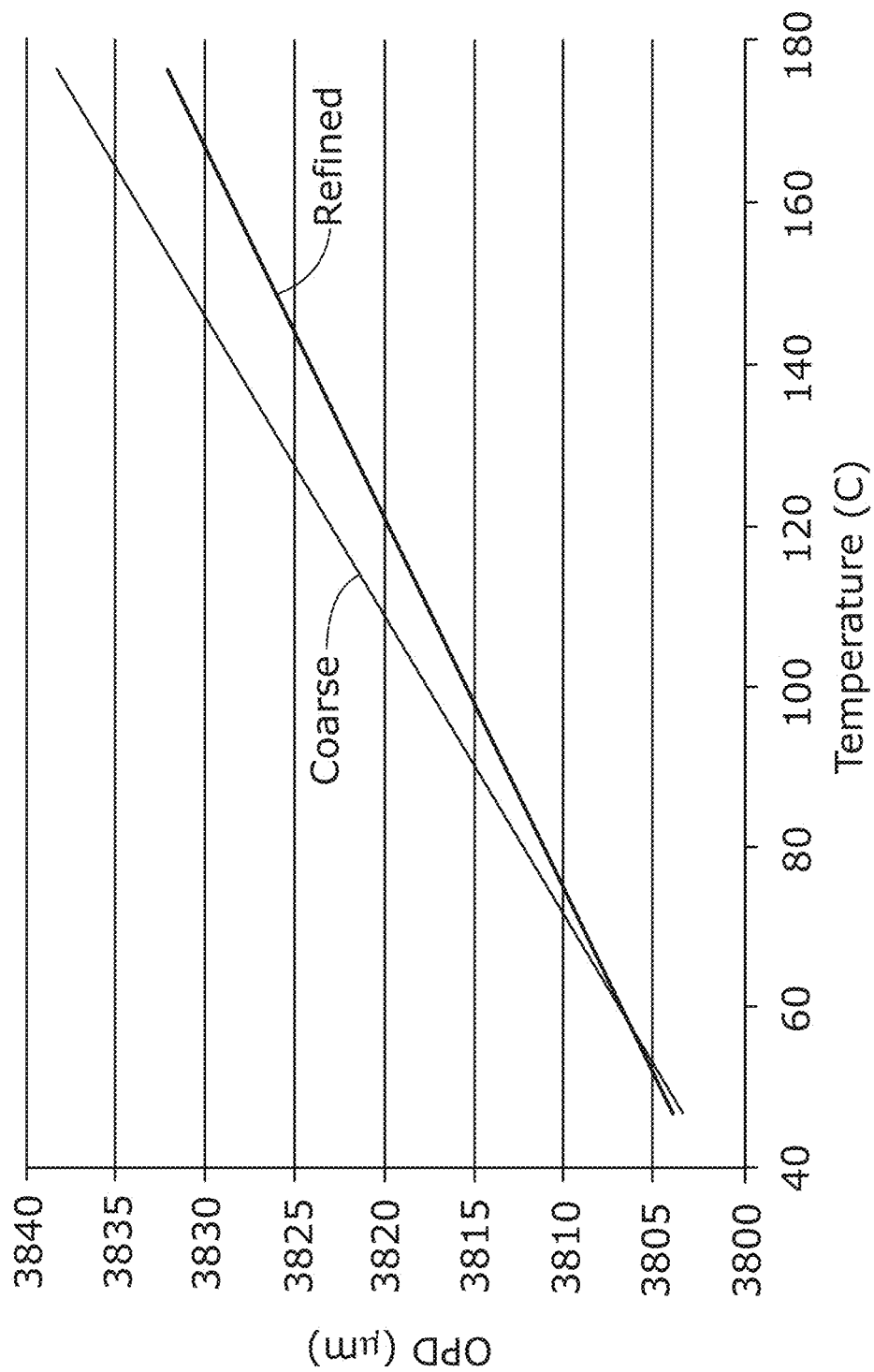
FIG. 13 corresponds to FIG. 12 in which the refined optical path difference signal has been de-stepped.
Figure 14:
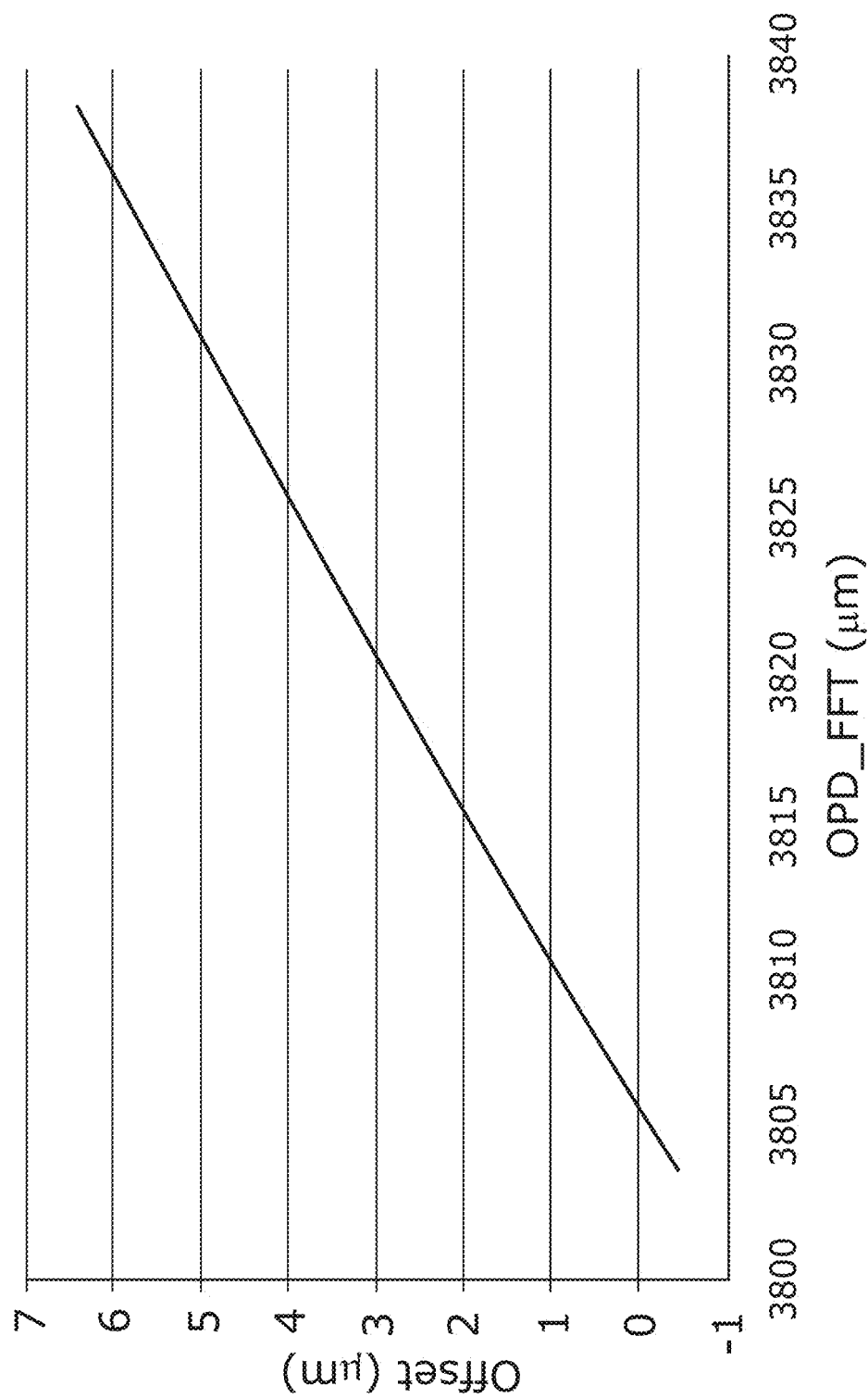
FIG. 14 shows an offset signal to be applied to adjust the coarse optical path difference signal to avoid the stepping illustrated in FIG. 12.

The variable offset may be calibrated for example in the following way. FIG. 12 shows the results of a calibration test applied to a sensor head having a sensing interference cavity formed of a dispersive material such as silicon, over a temperature range of 40 to 180 degrees Celsius, without applying the offset. It can be seen that, whereas the coarse optical path difference signal is largely represented by a straight line coarse OPD signal calibration curve, the refined optical path difference signal as represented by a refined OPD signal calibration curve undergoes a series of steps as the second detector function jumps from tracking one correlation peak to another. The steps are then removed from the refined OPD signal calibration curve to form a continuous refined OPD signal calibration curve as shown in FIG. 13, where it can be seen that the de-stepped refined OPD calibration curve has a shallower gradient than the coarse OPD curve. The offset function can now be derived such that when applied to the coarse optical path difference signal, the adjusted coarse signal follows the refined optical path difference signal. In this way, the adjusted coarse signal causes the second detector function to track a single correlation peak across the full range of a designed operating range. An offset function derived from the date of FIG. 13 is shown in FIG. 14, where the abscissa labeled "OPD_FFT" represents the unadjusted coarse optical path difference signal, and the ordinate labeled "Offset" is the offset value to be applied to yield the adjusted coarse optical path difference signal to ensure reliable tracking of a single correlation peak by the second detector function.

Figure 15:
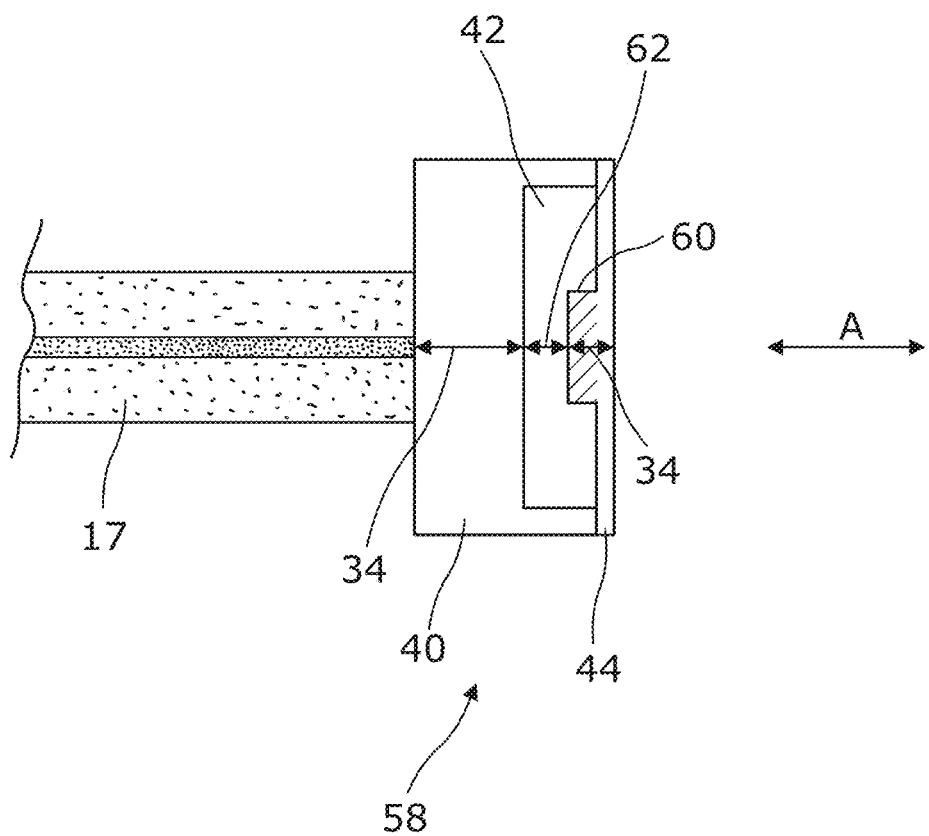
FIG. 15 illustrates in cross section a sensor head similar to that of FIG. 2, but adapted to include a proof mass for use in detecting acceleration instead of pressure.

Aspects of the invention can be used to implement an optical sensor arranged to detect acceleration. FIG. 15 shows schematically how the sensor head of FIG. 2 could be adapted for such an application. In particular, in the adapted sensor head 58 a proof mass 60 is added to the membrane 44, for example by providing a thicker portion of the membrane, bonding an extra element to the membrane, forming the membrane to the thicker in a central portion, or similar. The proof mass could be provided at the internal side of the membrane, or the external side, or both. An acceleration sensing optical cavity 62 is then provided between the membrane and/or the proof mass, and an internal surface of physical cavity 42. Temperature sensing optical cavities 34 may be provided in the same way as in FIG. 2, and in other ways.

For example, the acceleration sensing optical cavity 62 may be more generally provided by an acceleration sensing interference element, which could for example be a physical cavity in the sensor head which is bounded by at least one surface which moves according to the acceleration at the sensor head. Such a physical cavity may typically be filled with a low pressure gas. The acceleration sensing interference element may be a Fabry Perot cavity or similar. The temperature sensing optical cavity may more generally be a temperature interference element, and may be provided for example by a cavity or interference element which does not spatially overlap with the acceleration sensing cavity or interference element. More particularly, if both the temperature and acceleration sensing interference elements are provided by optical cavities, these optical cavities may be physically separate, non-overlapping cavities, although they could be partly defined by a mutual reflective surface for example as shown in FIG. 15. Typically, in contrast with the acceleration sensing interference element, the temperature sensing interference element will not be responsive or sensitive to acceleration, and will not be defined by any surface of the acceleration sensing interference element which is responsive to acceleration.

Acceleration of the sensor in the direction of axis A gives rise to displacement of the proof mass, which is detected using an interrogator as described above from change in optical path length of the acceleration sensing optical cavity 62. Changes in the elastic or other bulk properties of the material of the sensor head 18 due to changes in temperature of the material give rise to changes in behavior of the proof mass displacement under a given acceleration. Detected temperature of the sensor head 58 may therefore be used to compensate an acceleration signal output by the interrogator 5 to be consistent under changes in temperature. The sensing of temperature for the purposes of compensation of the acceleration signal to be output may, in particular, be carried out using at least the first, and optionally also the second detector functions described above in combination with a suitable spectral engine, while the detection of acceleration from the optical path length of the acceleration sensing cavity may be carried out using, for example, the dual wavelength scheme mentioned for detecting pressure in connection with FIG. 3 above, or other schemes known to the skilled person.

Figure 16:
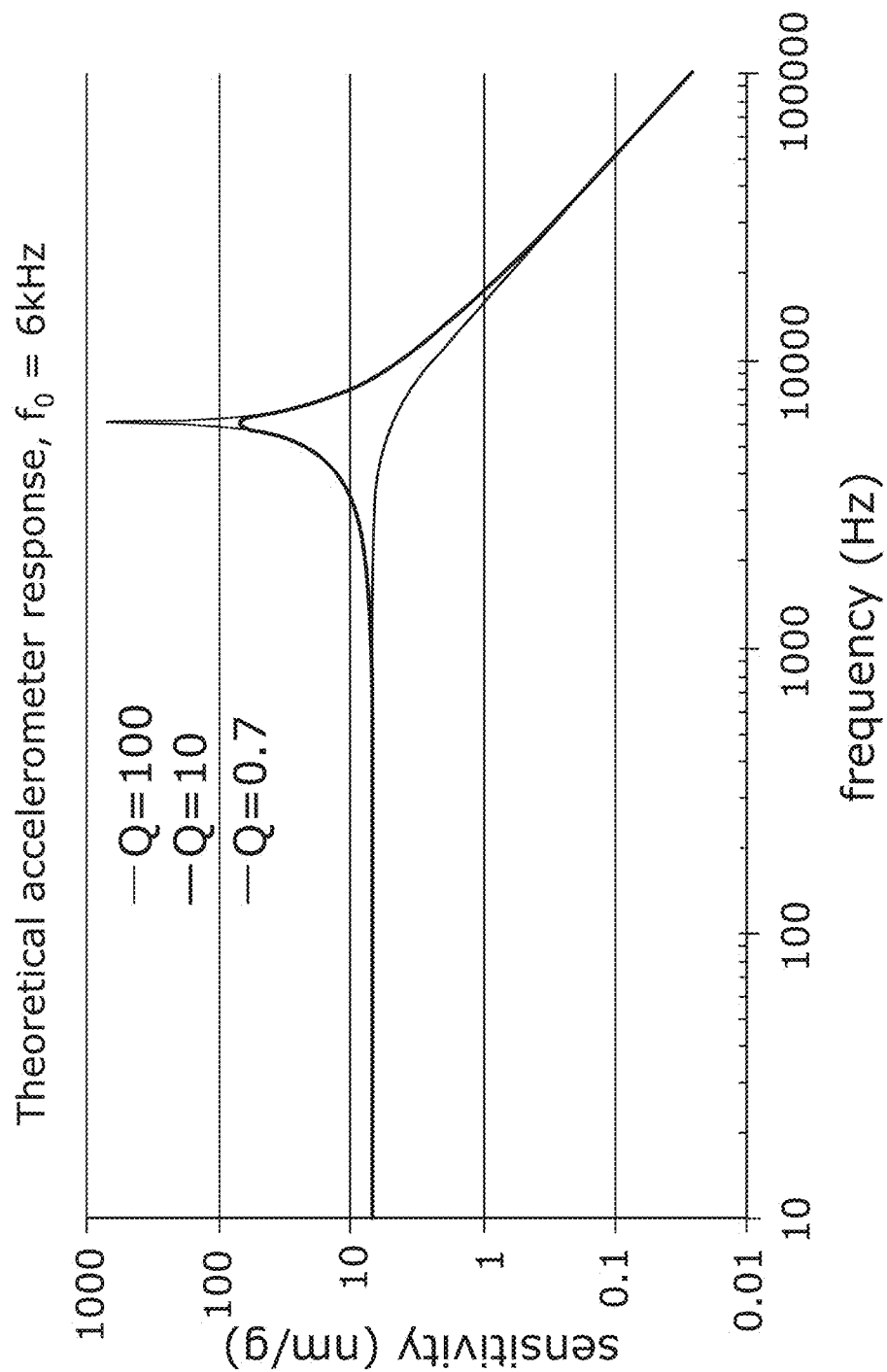
FIG. 16 illustrates a theoretical accelerometer response which could be achieved using a sensor head such as that of FIG. 15.

More generally, embodiments of the invention may provide a simultaneous acceleration and temperature sensor. Acceleration measurement can be established by forming a mass-spring system with a resonant frequency f0 and measuring the resulting relative displacement y via the cavity size (d1−y). One such suitable mass-spring system is that already shown in FIG. 15, in which the mass is provided by proof mass 60, and the spring by membrane 44, but other mass-spring systems can easily be used such as systems involving cantilevers. In general, the accelerometer sensitivity S defined as relative displacement y per applied acceleration S=y/a is a function of (acceleration) signal frequency. FIG. 16 shows a theoretical sensitivity for a mass-spring system with a resonant frequency of 6 kHz for three different values of the Q factor familiar to the person skilled in the art for such systems. As can be seen, for signal frequencies well below the resonant frequency the sensitivity is largely independent of signal frequency and is given by:

$$S = \frac{1}{(2\pi f_0)^2}$$

In this case, the acceleration can be determined by measuring the relative displacement in the same manner as it was described for sensing of pressure above. The acceleration sensing optical cavity 62 can be an air cavity or filled with another gas optionally at low pressure. At the same time, temperature can be determined by measuring the optical path difference of one or both optical cavities 34. Simultaneous temperature information may be required to compensate for the change in sensitivity as the resonant frequency may depend on temperature. However, the provided sensor may output separate acceleration and temperature signals, with any compensation for the correction of the acceleration on the basis of the temperature measurement being carried out elsewhere if and as required.

Figure 17:
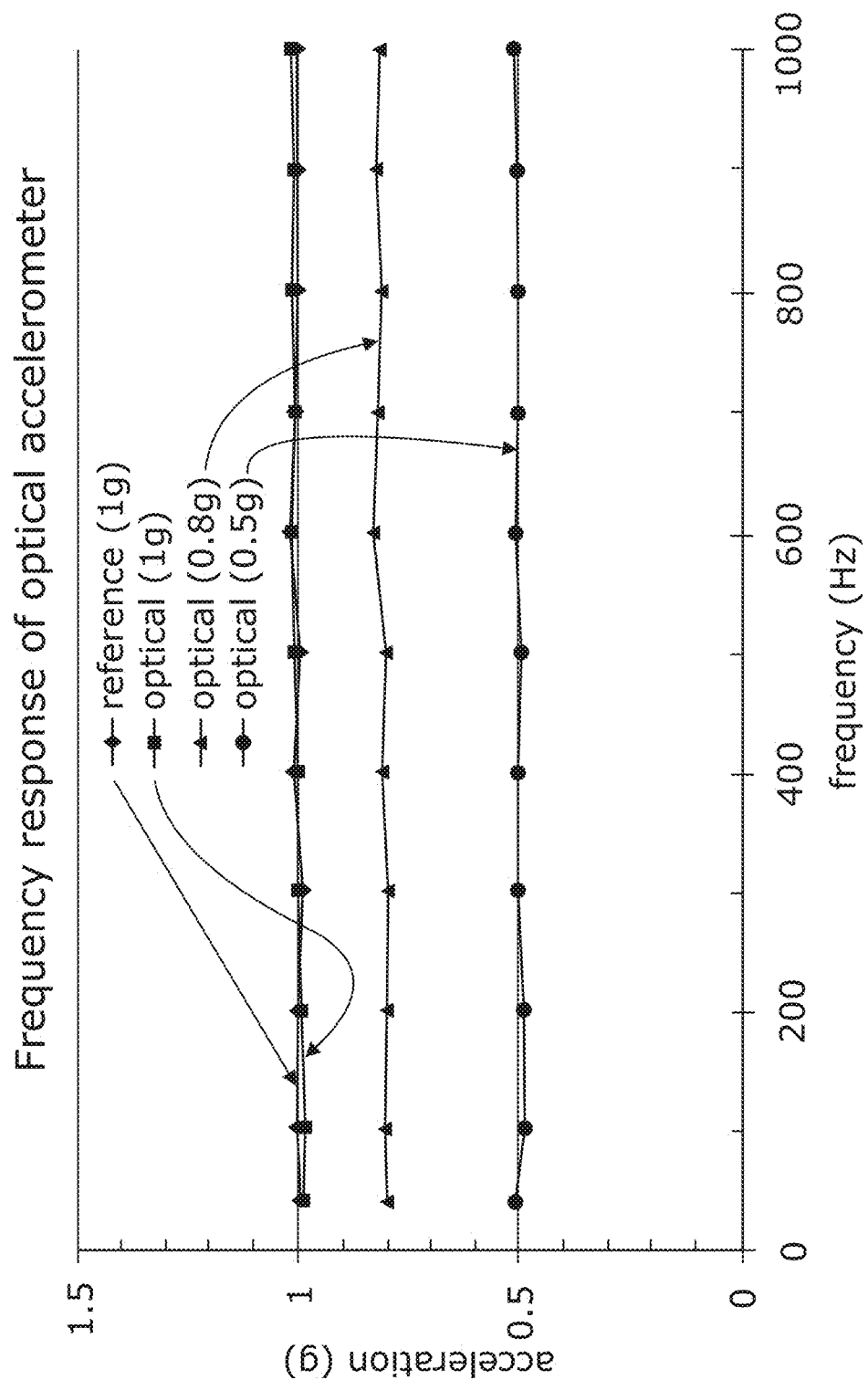
FIG. 17 illustrates experimental accelerometer responses based on a sensor head of FIG. 15 used in conjunction with an interrogator of FIG. 1 or 3.

A prototype of a simultaneous acceleration and temperature sensor was constructed using the sensor head shown in FIG. 15 and the interrogator of FIG. 3, in which the pressure sensing functionality of FIG. 3 was adapted for detecting acceleration. The prototype was tested by mounting both a reference accelerometer and the sensor head of FIG. 15 on a vibration table and applying acceleration levels of 0.5 g, 0.8 g and 1 g over a frequency range of up to 1 kHz. FIG. 17 shows the measured results for the optical acceleration sensor together with the reading of the reference sensor at 1 g. A near flat frequency response was observed and the output is proportional to the acceleration level.

In implementing the simultaneous acceleration and temperature sensor, the sensor head 58 can be designed so that the acceleration detecting optical cavity 62 is measured using the dual-wavelength interrogator (DWI) scheme mentioned above, while the one or more temperature sensing optical cavities 34 are still measured with the spectral method described above for example in connection with FIGS. 1 and 3. This is particular useful as acceleration is a dynamic measurement requiring potentially a high signal bandwidth exceeding the speed of the spectral engine. The DWI approach is able to provide such a high bandwidth and can be applied to acceleration, pressure, or indeed, any other measurand requiring high signal bandwidth.

Figure 18:
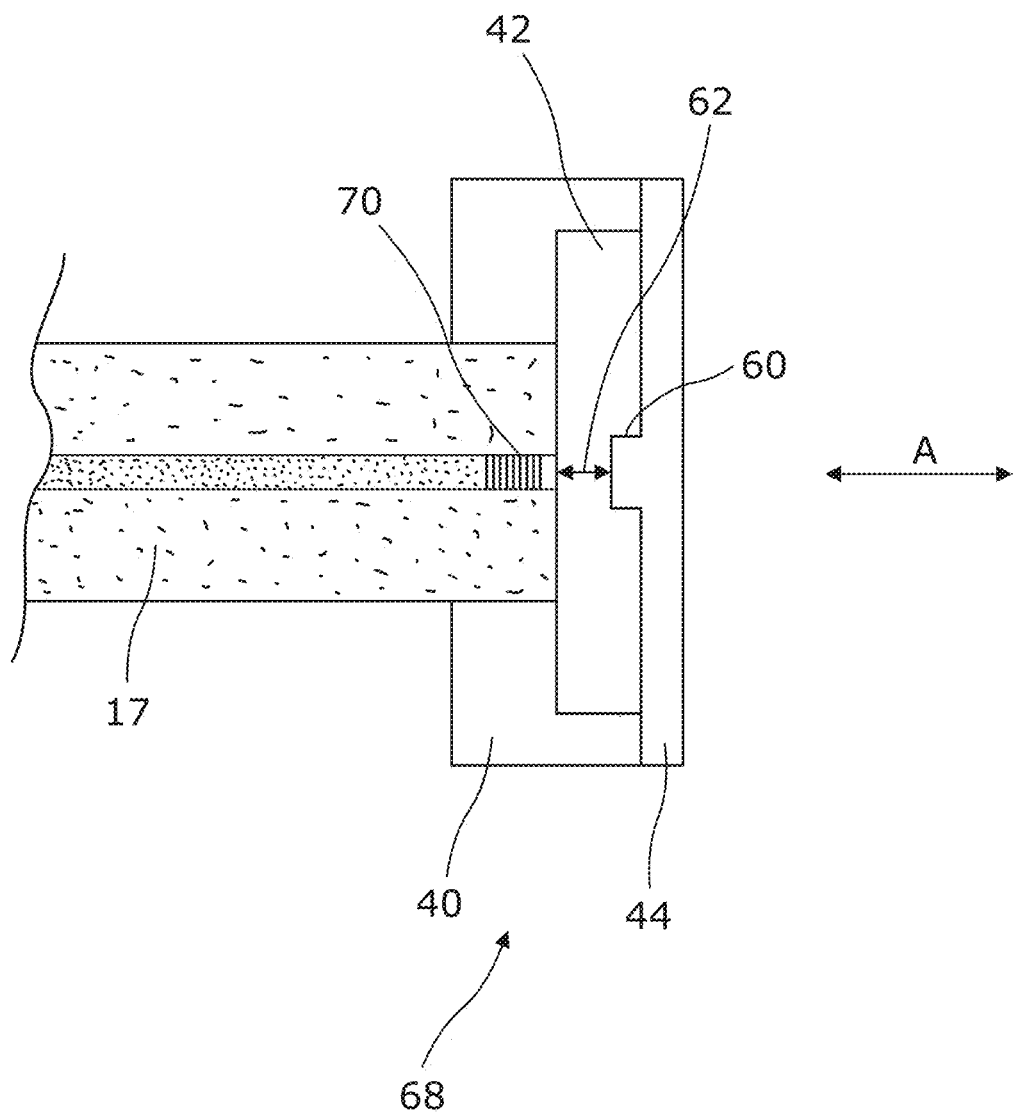
FIG. 18 illustrates an alternative arrangement for sensing interferometers in embodiments of the invention.

An alternative implementation of the accelerometer sensor head of FIG. 15 is shown in FIG. 18. In the illustrated arrangement, elements corresponding to elements in FIGS. 2 and 15 are shown using like reference numerals. Instead of using a temperature sensing optical cavity provided by material of the substrate as shown in FIG. 15, in FIG. 18 temperature sensing at the further adapted sensor head 68 is carried out using a fibre Bragg grating (FBG) 70 inscribed into the core of the optical fibre 17. A review of prior art regarding FBGs for sensing applications with particular emphasis on applications at high temperatures can be found in S. J. Mihailov, 'Fiber Bragg Grating Sensors for Harsh Environments', Sensors Vol. 12, pp. 1898-1918 (2012).

The FBG 70 is preferably located in the optical fibre 17 at a position which is at least partly within or proximal to the sensor head 68, to ensure good thermal contact with the sensor body. The acceleration sensing optical cavity may then be formed between the membrane and/or the proof mass, and an end of the optical fibre 17. The end of the optical fibre may be cleaved or polished or otherwise treated to provide a suitable partial reflection.

Figure 20:
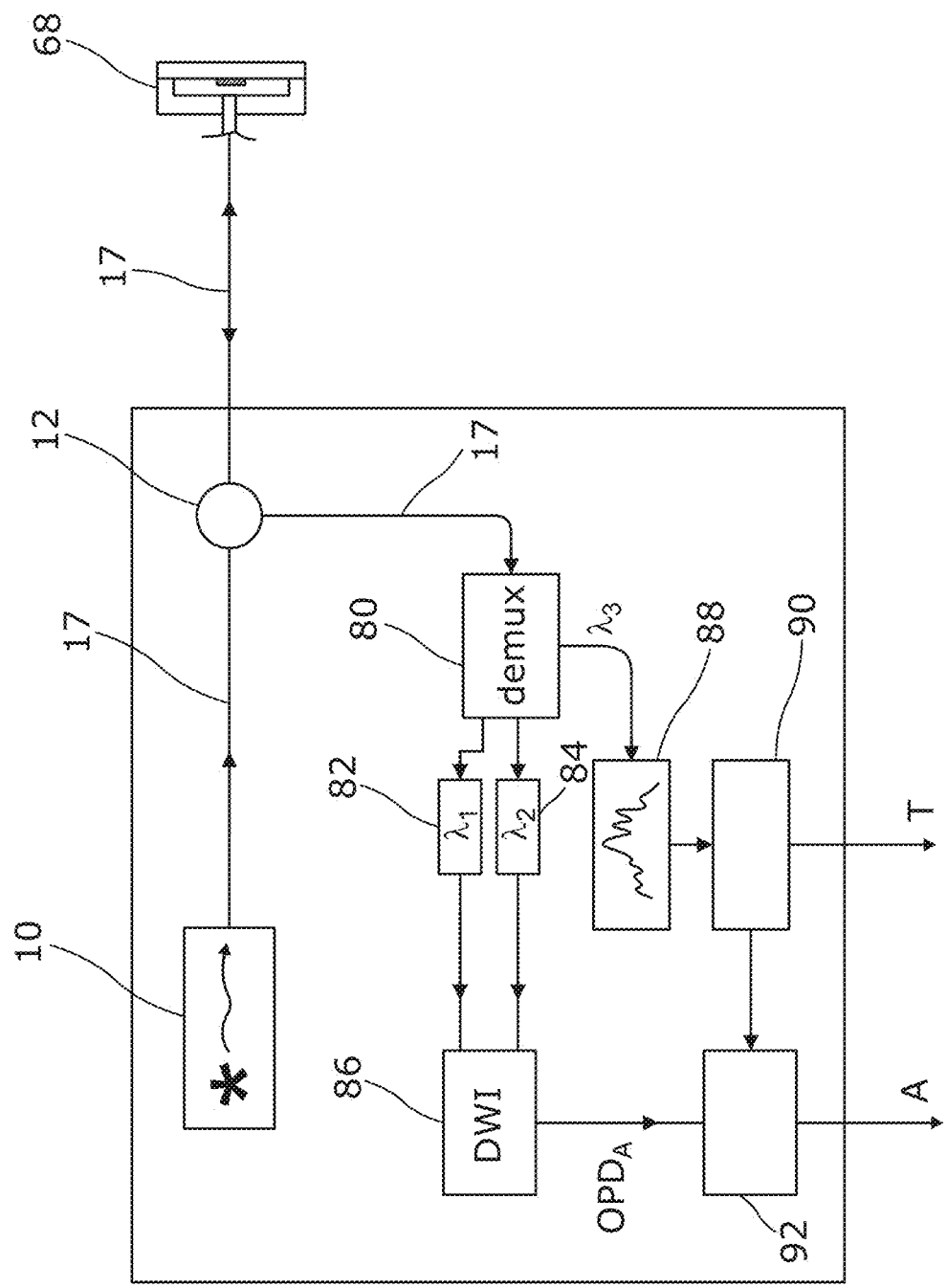
FIG. 20 shows a response to the fibre Bragg grating within detected interference.

The FBG 70 provides a narrow reflection peak at the so-called Bragg wavelength, the position of which shifts with ambient temperature in a glass optical fibre at a typical rate of about 13 pm/° C. at 1.55 µm. Temperature measurement capability may be established by measuring the Bragg wavelength using, for instance, a spectral engine 20 as already discussed above and illustrated in FIGS. 1 and 3, or as shown as spectral engine 88 in FIG. 20, and then converting the Bragg wavelength to temperature using a suitable calibration.

Figure 19:
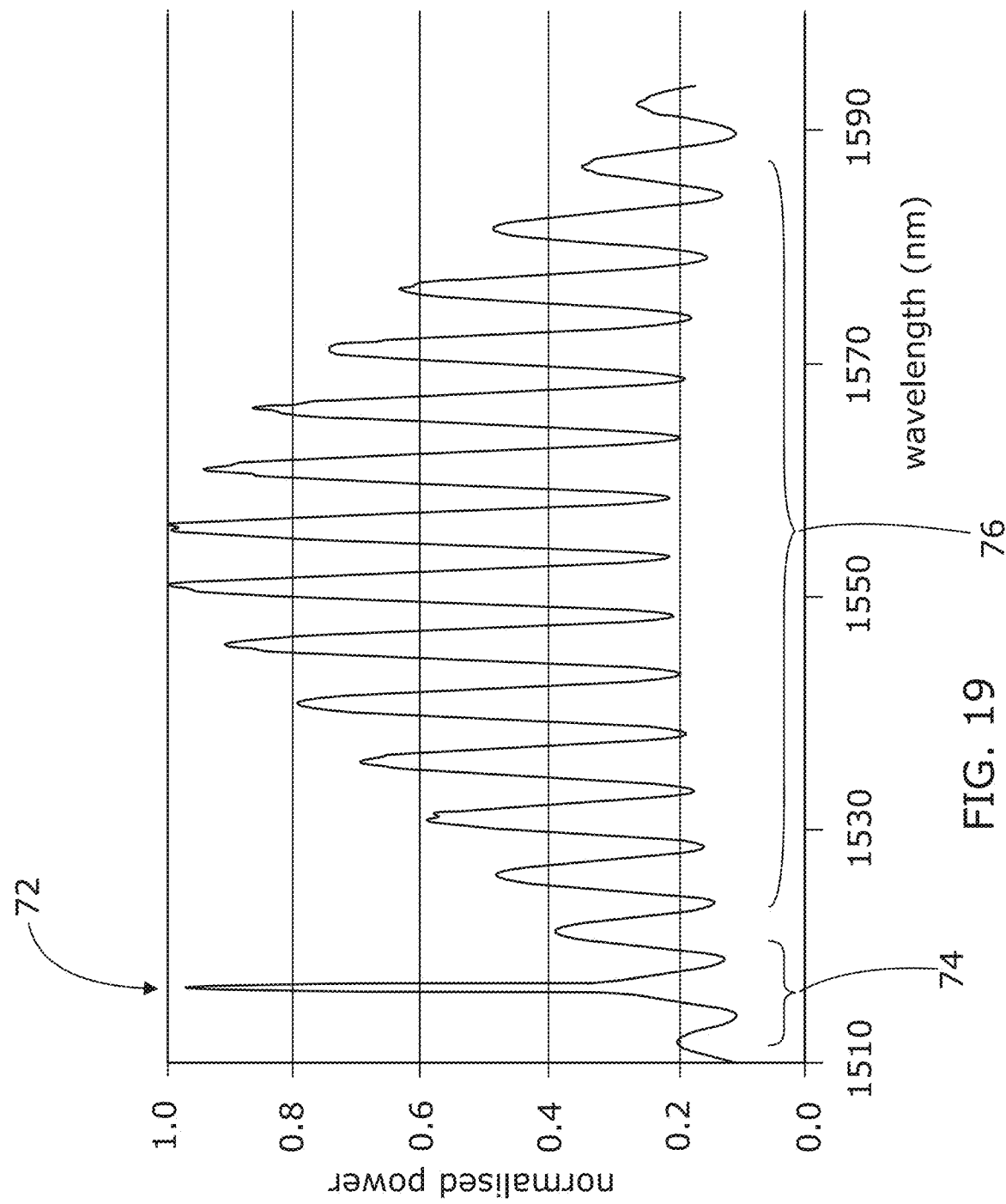
FIG. 19 shows an alternative arrangement of a sensor head for detecting acceleration, in which temperature is detected using a fibre Bragg grating.

Care should be taken in constructing the sensor head 68 of FIG. 18 to provide a reflection strength and initial Bragg wavelength of the FBG 70 appropriately so as not to create undue interference between the FBG based temperature measurement and any other Fourier transform and/or cross-correlation function based measurement capabilities which may be implemented for example as already discussed above. This can be achieved, for instance, by selecting a highly reflective grating with a Bragg wavelength 72 located at one of the edges of the spectrum of the probe light, shown in FIG. 19 using an interference spectrum due to the acceleration sensing optical cavity 62, detected by the spectral engine.

A high reflectivity of the FBG 70 can compensate for the lower light level at the edges of the probe light spectrum so as to achieve values of return power similar to those generated from the low-reflectivity Fabry-Perot cavity, typically used for the acceleration sensing optical cavity 62, recorded around the peak of the probe light spectrum. The available wavelength space can therefore be divided into a marginal region 74, as shown on the left hand side of FIG. 19, which is reserved for the FBG measurement, and a main region 76 reserved for measurement of the acceleration sensing optical cavity 62.

Within the marginal region 74 the FBG peak will shift in wavelength as a function of temperature at the FBG, and the position of this peak in wavelength can be established if only readings above a certain threshold value are considered. In this way the influence of the acceleration sensing cavity 62 on the FBG measurement is minimised. On the other hand, the main region 76 reserved for the measurement of the acceleration sensing optical cavity 62 does not contain the FBG peak 72, and the optical path difference relating to the acceleration sensing cavity can therefore be calculated as discussed elsewhere herein.

Although the acceleration sensing optical cavity of FIG. 18 can be interrogated using a spectral engine and optionally first and second detector functions as illustrated in FIGS. 1 and 3, the acceleration sensing optical cavity may instead be detected using the above mentioned DWI readout method. An arrangement for this is shown schematically in FIG. 20. A de-multiplexing filter 80 is used to generate two separate wavelengths bands $\lambda 1$ and $\lambda 2$ from the broad-band probe light signal returned from the sensor head 68 through the coupler 12. The optical power contained within these two bands is then detected by two separate photodiodes 82, 84 respectively. The signals from these photodiodes is passed to DWI analyser 86 to provide an output which is the ratio of the readings from the two photodiodes which is indicative of the optical path difference $OPD_A$ of the acceleration sensing optical cavity.

A third separate wavelength band $\lambda 3$ is added to the probe light in such a way as not to interfere with the two DWI wavelength bands $\lambda 1$ and $\lambda 2$. This additional wavelength band contains the FBG wavelength and is chosen to be wide enough to fully cover the anticipated wavelength shifts of the FBG peak with temperature. Readout of the FBG peak wavelength is achieved employing a spectral engine 88 providing an output for analysis by FBG peak detector 90. The FBG peak detector 90 can provide a direct temperature output T if required, and/or can provide an output to an acceleration detector 92 which compensates using the sensed temperature to produce a corrected acceleration output A.

Examples of a suitable embodiment of the spectral engine 88 include a spectrum analyser with peak detection capability or a ratiometric demodulation scheme (for example see S. M. Melle et al., 'Practical fiber-optic Bragg grating strain gauge system', Applied Optics, Vol. 32, pp. 3601-3609, 1993). whereby the transmit power depends on the position of the FBG wavelength with respect to the filter slope.

A number of variations and modifications to the described embodiments will be apparent to the person skilled in the art.

Figure 21:
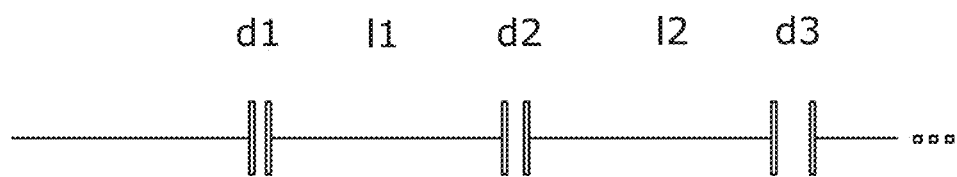
FIG. 21 illustrates detection of the acceleration sensing optical cavity using a dual-wavelength interrogator, and of the fibre Bragg grating using a spectral engine.

For example, the presented techniques are not restricted to simultaneous measurands within the same sensor head 18, 58, 68 but are also applicable to spatially separated but still simultaneously measured parameters. By way of example, FIG. 21 illustrates a number of Fabry-Perot cavities d1, d2, d3 . . . that could be addressed in series, the cavities being spaced by optical distances l1, l2 . . . with the condition d1, d2, d3 . . . <<l1, l2, . . . , so that only the cavities themselves are visible and not the compounded cavities d1+l1, . . . . The Fabry-Perot cavities could also be replaced with Mach-Zehnder interferometers in series or a mixture of both types or a combination of interferometers in series and in parallel.

What is claimed:

1. An accelerometer comprising:
    a sensor head which comprises:
        a proof mass reactive to acceleration;
        an acceleration sensing optical cavity comprising a physical cavity in the sensor head and having a first optical path difference responsive to movement of said proof mass reactive to an acceleration, reaction of the proof mass to acceleration also being sensitive to temperature at the sensor head; and
        at least one temperature sensing optical cavity comprising material of the sensor head and having a second optical path difference responsive to temperature at the sensor head but not being sensitive to acceleration;
    an interrogator arranged to detect acceleration at the sensor head from the first optical path difference, to compensate the detected acceleration for temperature at the sensor head based on detection of the second optical path difference, and to provide a corresponding compensated acceleration output; and
    an optical fibre coupling the sensor head to the interrogator such that the interrogator detects both the first and second optical path differences through the optical fibre.

2. The accelerometer of claim 1 wherein the interrogator is arranged to determine temperature at the sensor head from the second optical path difference and to provide a corresponding temperature output.

3. The accelerometer of claim 1 wherein the acceleration sensing optical cavity and the temperature sensing optical cavity are not spatially overlapping.

4. The accelerometer of claim 1 wherein the sensor head comprises a diaphragm providing a boundary of the acceleration sensing optical cavity, and the proof mass is arranged to cause deflection of the diaphragm reactive to acceleration.

5. The accelerometer of claim 4 wherein the proof mass is formed integrally with or is comprised in the diaphragm.

6. The accelerometer of claim 1 wherein the accelerometer comprises one or more sensing interference elements, and the accelerometer further comprises:
    an optical source arranged to deliver probe light to one or more of the sensing interference elements;
    a spectral engine arranged to detect an interference spectrum in probe light received from the one or more sensing interference elements;
    a first optical path difference signal generator arranged to generate one or more coarse optical path difference signals, corresponding to the optical path differences of the one or more sensing interference elements, from the interference spectrum; and
    a second optical path difference signal generator arranged to generate one or more refined optical path difference signals, corresponding to the optical path differences of the one or more sensing interference elements, from the interference spectrum and the corresponding coarse optical path difference signals.

7. The accelerometer of claim 6, wherein the first optical path difference signal generator is arranged to:
    derive an optical path difference function from the interference spectrum;
    locate one or more peaks in the optical path difference function, each of the one or more peaks corresponding to a different one of the sensing interference elements; and
    generate the one or more coarse optical path difference signals from the corresponding peaks.

8. The accelerometer of claim 7 wherein the optical path difference function is derived from the interference spectrum using at least one of: a discrete Fourier transform; and an envelope of a cross-correlation of the interference spectrum.

9. The accelerometer of claim 6 wherein the second optical path difference signal generator is arranged to generate said one or more refined optical path difference signals using cross correlation of the interference spectrum with one or more sets of one or more periodic transfer functions, each set of periodic transfer functions being selected to yield the refined optical path difference signal for a selected one of the sensing interference elements.

10. The accelerometer of claim 9 wherein the second optical path difference signal generator is arranged to select each set of one or more periodic transfer functions based on the coarse optical path difference signal for the corresponding sensing interference element.

11. The accelerometer of claim 9 wherein the second optical path difference signal generator is arranged to select each set of periodic transfer functions to correspond to a range of optical path differences encompassing the optical path difference of only a corresponding one of said sensing interference elements.

12. The accelerometer of claim 9 wherein the second optical path difference signal generator is arranged to locate a peak in the cross correlation for each set of periodic transfer functions, and to generate the one or more refined path difference signals based on the location of the peaks in the cross correlation.

13. The accelerometer of claim 9 wherein the second optical path difference signal generator is arranged to select each set of periodic transfer functions such that the cross correlation using that set contains only one peak in the cross correlation.

14. The accelerometer of claim 9 wherein the interrogator is arranged to apply a variable offset to at least one of the coarse optical path difference signals, to compensate for different rates of change of respective coarse and fine optical path difference signals due to dispersion in a corresponding sensing interference element.

15. The accelerometer of claim 6 wherein the one or more sensing interference elements comprise the acceleration sensing optical cavity.

16. The accelerometer of claim 6 wherein the at least one temperature sensing optical cavity is a said sensing interference element.

17. The accelerometer of claim 16 wherein the interrogator is arranged to compensate the detected acceleration for temperature at the sensor head using the refined optical path difference signal from the at least one temperature sensing optical cavity.

18. The accelerometer of claim 16 wherein the one or more sensing interference elements comprise both the temperature sensing optical cavity and the acceleration sensing optical cavity.

19. A method of detecting acceleration at a sensor head that comprises a proof mass reactive to acceleration, the method comprising:

providing at the sensor head an acceleration sensing optical cavity comprising a physical cavity in the sensor head and having a first optical path difference responsive to movement of said proof mass, reaction of the proof mass to acceleration also being sensitive to temperature at the sensor head;

providing at the sensor head at least one temperature sensing optical cavity comprising material of the sensor head and having a second optical path difference responsive to temperature at the sensor head but not being sensitive to acceleration;

providing an optical fibre coupling the sensor head to an interrogator such that the interrogator detects both the first and second optical path differences through the optical fibre;

detecting, by the interrogator, the second optical path difference of the at least one temperature sensing element to provide a second optical path difference signal;

detecting, by the interrogator, the first optical path difference; and generating a temperature compensated acceleration signal based on the detected first optical path difference and the second optical path difference signal.

20. The method of claim 19 wherein the acceleration sensing optical cavity and the temperature sensing optical cavity are not spatially overlapping.

21. The method of claim 19 wherein the sensor head comprises a diaphragm providing a boundary of the acceleration sensing optical cavity, and the proof mass is arranged to cause deflection of the diaphragm reactive to acceleration.

22. The method of claim 19 wherein the proof mass is formed integrally with or is comprised in the diaphragm.

* * * * *